(12) United States Patent
Honda

(10) Patent No.: US 11,702,127 B2
(45) Date of Patent: Jul. 18, 2023

(54) ASSIST MECHANISM AND ELECTRIC POWER STEERING DEVICE

(71) Applicant: NSK LTD., Tokyo (JP)

(72) Inventor: Yasushi Honda, Gunma (JP)

(73) Assignee: NSK LTD., Tokyo (JP)

( * ) Notice: Subject to any disclaimer, the term of this patent is extended or adjusted under 35 U.S.C. 154(b) by 450 days.

(21) Appl. No.: 16/957,961

(22) PCT Filed: Dec. 18, 2018

(86) PCT No.: PCT/JP2018/046512
§ 371 (c)(1),
(2) Date: Jun. 25, 2020

(87) PCT Pub. No.: WO2019/131315
PCT Pub. Date: Jul. 4, 2019

(65) Prior Publication Data
US 2020/0369315 A1    Nov. 26, 2020

(30) Foreign Application Priority Data

Dec. 28, 2017 (JP) ................................. 2017-254056
Sep. 11, 2018 (JP) ................................. 2018-170011

(51) Int. Cl.
*B62D 5/04* (2006.01)
*F16H 1/16* (2006.01)
(Continued)

(52) U.S. Cl.
CPC .............. *B62D 5/0454* (2013.01); *F16D 3/74* (2013.01); *F16H 1/16* (2013.01); *H02K 5/24* (2013.01);
(Continued)

(58) Field of Classification Search
CPC .......... B62D 5/0454; B62D 5/04; F16H 1/16; F16D 3/50; F16D 3/72
See application file for complete search history.

(56) References Cited

U.S. PATENT DOCUMENTS 7,670,228 B2 *  3/2010  Matsumoto ............... F16D 3/68
                                                    464/73
7,980,982 B2 *  7/2011  Yuta ....................... B62D 7/146
                                                    475/149
(Continued)

FOREIGN PATENT DOCUMENTS

JP    2005-67371 A    3/2005
JP    2006-46376 A    2/2006
(Continued)

OTHER PUBLICATIONS

Office Action dated Feb. 28, 2022 in Chinese Application No. 201880084080.X.
(Continued)

*Primary Examiner* — Kevin Hurley
*Assistant Examiner* — Michael R Stabley
(74) *Attorney, Agent, or Firm* — Sughrue Mion, PLLC

(57) ABSTRACT

An assist mechanism includes: an electric motor in which a rotor has a magnet and a stator has a winding; a shaft-shaped member in which a worm engaged with a worm wheel is formed; and a coupling that couples an output shaft of the electric motor and the shaft-shaped member to each other. The smallest rotation order among rotation orders of the electric motor and a rotation order of the worm are prime to each other.

14 Claims, 19 Drawing Sheets

(51) Int. Cl.
*F16D 3/50* (2006.01)
*F16D 3/72* (2006.01)
*F16D 3/74* (2006.01)
*H02K 5/24* (2006.01)
*H02K 7/00* (2006.01)
*H02K 7/116* (2006.01)

(52) U.S. Cl.
CPC ........... *H02K 7/003* (2013.01); *H02K 7/1166* (2013.01); *B62D 5/04* (2013.01); *F16D 3/50* (2013.01); *F16D 3/72* (2013.01); *H02K 2213/03* (2013.01)

(56) References Cited

U.S. PATENT DOCUMENTS

| | | | | |
|---|---|---|---|---|
| 9,653,964 | B2 * | 5/2017 | Nakamura | H02K 7/1166 |
| 9,755,470 | B2 * | 9/2017 | Hirotani | H02K 3/28 |
| 10,298,157 | B2 * | 5/2019 | Yoneda | H02K 11/24 |
| 2006/0001392 | A1 * | 1/2006 | Ajima | H02P 6/10 |
| | | | | 318/432 |
| 2006/0049703 | A1 * | 3/2006 | Hosono | H02K 29/08 |
| | | | | 310/68 B |
| 2007/0293325 | A1 * | 12/2007 | Matsumoto | F16D 3/68 |
| | | | | 464/104 |
| 2009/0241706 | A1 * | 10/2009 | Yuta | H02K 7/06 |
| | | | | 74/89.23 |
| 2011/0187242 | A1 * | 8/2011 | Takeuchi | H02K 21/02 |
| | | | | 310/90 |
| 2015/0180306 | A1 * | 6/2015 | Nakamura | H02K 13/10 |
| | | | | 310/68 R |
| 2016/0111985 | A1 * | 4/2016 | Yoneda | H02K 11/21 |
| | | | | 318/400.15 |
| 2017/0093242 | A1 * | 3/2017 | Hirotani | H02K 3/28 |
| 2018/0115202 | A1 * | 4/2018 | Hirotani | H02K 1/16 |
| 2019/0267926 | A1 * | 8/2019 | Tsubaki | B62D 5/0457 |

FOREIGN PATENT DOCUMENTS

| | | |
|---|---|---|
| JP | 2008-2496 A | 1/2008 |
| JP | 2009-236211 A | 10/2009 |
| JP | 2011-255818 A | 12/2011 |
| JP | 2014-23277 A | 2/2014 |
| JP | 2015-104189 A | 6/2015 |
| JP | 2016-82685 A | 5/2016 |
| JP | 2017-32105 A | 2/2017 |
| WO | 2017/154870 A1 | 9/2017 |
| WO | 2020/054560 A1 | 3/2020 |

OTHER PUBLICATIONS

Communication dated Apr. 5, 2022 from the Japanese Patent Office in Japanese Application No. 2019-561539.
International Search Report for PCT/JP2018/046512 dated Mar. 19, 2019 (PCT/ISA/210).
Office Action dated Nov. 21, 2022 in Chinese Application No. 201880084080.X.
"Motor Construction Down" Lusivie, University Press, Apr. 2011, p. 182 (5 pages total).
"Automotive Exercise Engineering", High Extension, Personant Traffic Press, Jan. 1998, pp. 167-169, (9 pages total).
Office Action dated Apr. 4, 2023 in Japanese Application No. 2022-105495.

* cited by examiner

ASSIST MECHANISM AND ELECTRIC POWER STEERING DEVICE

CROSS-REFERENCE TO RELATED APPLICATION

This application is a National Stage of PCT international application Ser. No. PCT/JP2018/046512 filed on Dec. 18, 2018 which designates the United States, incorporated herein by reference, and which is based upon and claims the benefit of priority from Japanese Patent Application No. 2017-254056 filed on Dec. 28, 2017 and Japanese Patent Application No. 2018-170011 filed on Sep. 11, 2018, the entire contents of which are incorporated herein by reference.

FIELD

The present invention relates to an assist mechanism and an electric power steering device.

BACKGROUND

Electric power steering devices for assisting torque necessary for steering a vehicle by an electric motor have been known (for example, Patent Literature 1).

CITATION LIST

Patent Literature

Patent Literature 1: Japanese Patent Application Laid-open No. 2005-067371

SUMMARY

Technical Problem

In conventional electric power steering devices, when vibration and noise caused by an electric motor as well as vibration and noise caused by a joint and a gear that transmit driving power from the electric motor to an output shaft of a steering wheel create a synergistic effect, unignorable vibration and noise may occur.

It is an object of the present invention to provide an assist mechanism and an electric power steering device capable of suppressing vibration and noise.

Solution to Problem

To achieve the object, an assist mechanism according to an aspect of the present invention includes: an electric motor in which a rotor has a magnet and a stator has a winding; a shaft-shaped member in which a worm engaged with a worm wheel is formed; and a coupling that couples an output shaft of the electric motor and the shaft-shaped member to each other, wherein a smallest rotation order among rotation orders of the electric motor and a rotation order of the worm are prime to each other.

To achieve the object, an assist mechanism according to an aspect of the present invention includes: an electric motor; a shaft-shaped member in which a worm engaged with a worm wheel is formed; and a coupling that couples an output shaft of the electric motor and the shaft-shaped member to each other, wherein a rotation order of the worm and a rotation order of the coupling are prime to each other.

To achieve the object, an assist mechanism according to an aspect of the present invention includes: an electric motor in which a rotor has a magnet and a stator has a winding; a shaft-shaped member in which a worm engaged with a worm wheel is formed; and a coupling that couples an output shaft of the electric motor and the shaft-shaped member to each other, wherein a smallest rotation order among rotation orders of the electric motor and a rotation order of the worm are prime to each other, the smallest rotation order among the rotation orders of the electric motor and a rotation order of the coupling are prime to each other, and the rotation order of the worm and the rotation order of the coupling are prime to each other.

To achieve the object, an assist mechanism according to an aspect of the present invention includes: an electric motor; a shaft-shaped member in which a worm engaged with a worm wheel is formed; and a coupling that couples an output shaft of the electric motor and the shaft-shaped member to each other, wherein a smallest rotation order among rotation orders of the electric motor and a rotation order of the coupling are prime to each other.

To achieve the object, an assist mechanism according to an aspect of the present invention includes: an electric motor; a shaft-shaped member in which a worm engaged with a worm wheel is formed; and a coupling that couples an output shaft of the electric motor and the shaft-shaped member to each other, wherein at least two rotation orders of a smallest rotation order among rotation orders of the electric motor, a rotation order of the worm, and a rotation order of the coupling are different from each other.

To achieve the object, an electric power steering device according to an aspect of the present invention includes the assist mechanism, wherein the worm wheel is provided to an output shaft of a steering wheel.

Thus, the rotation orders of rotating configurations can be made different to shift their timings of occurrence of vibration and noise. This can prevent larger vibration and noise, which would otherwise be caused due to a synergistic effect created by concurrence of vibrations and noises of these configurations. Consequently, vibration and noise can be reduced.

In the assist mechanism according to an aspect of the present invention, the rotation order of the electric motor is n times a larger natural number of two natural numbers other than 1 when a multiplication of the two natural numbers expresses the number of poles of a magnet in the rotor, n is a natural number of 1 or greater, and the rotation order of the worm is the number of teeth of the worm wheel that advance in response to one rotation of the shaft-shaped member.

In the assist mechanism according to an aspect of the present invention, the rotation order of the worm is the number of teeth of the worm wheel that advance in response to one rotation of the shaft-shaped member, the coupling includes a first transmission member fixed to the output shaft, a second transmission member fixed to the shaft-shaped member, and a third transmission member engaged with a predetermined number of projections of each of the first transmission member and the second transmission member to couple the first transmission member and the second transmission member to each other, and the rotation order of the coupling is the predetermined number.

In the assist mechanism according to an aspect of the present invention, the rotation order of the electric motor is n times a larger natural number of two natural numbers other than 1 when a multiplication of the two natural numbers expresses the number of poles of a magnet in the rotor, n is a natural number of 1 or greater, the rotation order of the worm is the number of teeth of the worm wheel that advance in response to one rotation of the shaft-shaped member, the coupling includes a first transmission member fixed to the output shaft, a second transmission member fixed to the shaft-shaped member, and a third transmission member engaged with a predetermined number of projections of each of the first transmission member and the second transmission member to couple the first transmission member and the second transmission member to each other, and the rotation order of the coupling is the predetermined number.

In the assist mechanism according to an aspect of the present invention, the rotation order of the electric motor is n times a larger natural number of two natural numbers other than 1 when a multiplication of the two natural numbers expresses the number of poles of a magnet or a commutator in the rotor, n is a natural number of 1 or greater, and the rotation order of the worm is the number of teeth of the worm wheel that advance in response to one rotation of the shaft-shaped member.

In the assist mechanism according to an aspect of the present invention, the rotation order of the electric motor is n times a larger natural number of two natural numbers other than 1 when a multiplication of the two natural numbers expresses the number of poles of a magnet or a commutator in the rotor, n is a natural number of 1 or greater, the coupling includes a first transmission member fixed to the output shaft, a second transmission member fixed to the shaft-shaped member, and a third transmission member engaged with a predetermined number of projections of each of the first transmission member and the second transmission member to couple the first transmission member and the second transmission member to each other, and the rotation order of the coupling is the predetermined number.

Thus, the rotation orders of the rotating configurations can be specified based on the number of configurations that move at positions away from the respective rotation axes along with the rotations of the rotating configurations, and the rotation orders can be made different. Therefore, their timings of occurrence of vibration and noise can be shifted. This can more reliably prevent larger vibration and noise, which would otherwise be caused due to a synergistic effect created by concurrence of vibrations and noises of these configurations. Consequently, vibration and noise can be more reliably reduced.

In the assist mechanism according to an aspect of the present invention, the rotation order of the coupling is 5 or 7.

In the assist mechanism according to an aspect of the present invention, the smallest rotation order among the rotation orders of the electric motor, the rotation order of the worm, and the rotation order of the coupling are different from one another.

In the assist mechanism according to an aspect of the present invention, the coupling includes a first transmission member fixed to the output shaft, a second transmission member fixed to the shaft-shaped member, and a third transmission member engaged with five or seven projections of each of the first transmission member and the second transmission member to couple the first transmission member and the second transmission member to each other, and the rotation order of the coupling is the number of the projections.

Thus, the rotation order of the coupling can be made difficult to be equal to the rotation orders of other configurations. This can more reliably prevent larger vibration and noise, which would otherwise be caused due to a synergistic effect created by concurrence of vibrations and noises of these configurations. Consequently, vibration and noise can be more reliably reduced.

In the assist mechanism according to an aspect of the present invention, the smallest rotation order among the rotation orders of the electric motor is 3, the rotation order of the worm is 2, and the rotation order of the coupling is 5 or 7.

Thus, all rotation orders of the electric motor, the worm, and the coupling can be made different. This can more reliably prevent larger vibration and noise, which would otherwise be caused due to a synergistic effect created by concurrence of vibrations and noises of these configurations. Consequently, vibration and noise can be more reliably reduced.

In the assist mechanism according to an aspect of the present invention, the smallest rotation order among the rotation orders of the electric motor is 4, the rotation order of the worm is 3, and the rotation order of the coupling is 5 or 7.

Thus, all rotation orders of the electric motor, the worm, and the coupling can be made different. This can more reliably prevent larger vibration and noise, which would otherwise be caused due to a synergistic effect created by concurrence of vibrations and noises of these configurations. Consequently, vibration and noise can be more reliably reduced.

In the assist mechanism according to an aspect of the present invention, the smallest rotation orders among the rotation orders of the electric motor is 5, the rotation order of the worm is 2, and the rotation order of the coupling is 7.

Thus, all rotation orders of the electric motor, the worm, and the coupling can be made different. This can more reliably prevent larger vibration and noise, which would otherwise be caused due to a synergistic effect created by concurrence of vibrations and noises of these configurations. Consequently, vibration and noise can be more reliably reduced.

In the assist mechanism according to an aspect of the present invention, the smallest rotation order among the rotation orders of the electric motor is 5, the rotation order of the worm is 3, and the rotation order of the coupling is 4.

Thus, all rotation orders of the electric motor, the worm, and the coupling can be made different. This can more reliably prevent larger vibration and noise, which would otherwise be caused due to a synergistic effect created by concurrence of vibrations and noises of these configurations. Consequently, vibration and noise can be more reliably reduced.

Advantageous Effects of Invention

According to the present invention, vibration and noise can be reduced.

DESCRIPTION OF EMBODIMENTS

Embodiments of the present invention are described below with reference to the drawings, but the present invention is not limited thereto. The requirements in the embodiments described below can be combined as appropriate. Some of components are not used in some cases.

First Embodiment

Figure 1:
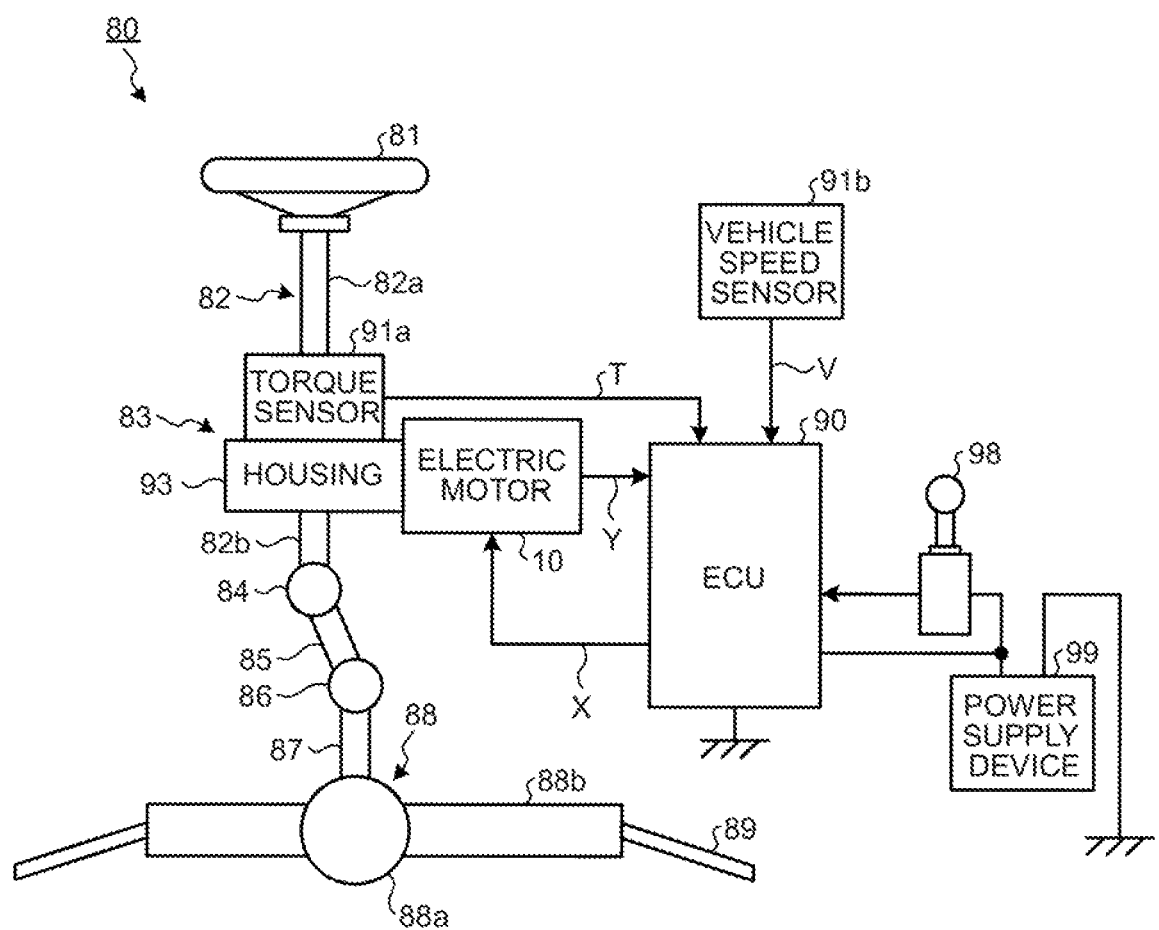
FIG. 1 is a diagram illustrating a configuration example of an electric power steering device including an assist mechanism in a first embodiment.

FIG. 1 is a diagram illustrating a configuration example of an electric power steering device 80 including an assist mechanism 83 in a first embodiment. The electric power steering device 80 includes, in the order in which force applied by a steerer is transmitted, a steering wheel 81, a steering shaft 82, an assist mechanism 83, a universal joint 84, a lower shaft 85, a universal joint 86, a pinion shaft 87, a steering gear 88, and a tie rod 89. The electric power steering device 80 further includes an electronic control unit (ECU) 90, a torque sensor 91a, and a vehicle speed sensor 91b.

The steering shaft 82 includes an input shaft 82a and an output shaft 82b. One end portion of the input shaft 82a is coupled to the steering wheel 81, and the other end portion is coupled to the assist mechanism 83 through the torque sensor 91a. One end portion of the output shaft 82b is coupled to the assist mechanism 83, and the other end portion is coupled to the universal joint 84. In the first embodiment, the input shaft 82a and the output shaft 82b are formed from magnetic material such as iron.

One end portion of the lower shaft 85 is coupled to the universal joint 84, and the other end portion is coupled to the universal joint 86. One end portion of the pinion shaft 87 is coupled to the universal joint 86, and the other end portion is coupled to the steering gear 88.

The steering gear 88 includes a pinion 88a and a rack 88b. The pinion 88a is coupled to the pinion shaft 87. The rack 88b is engaged with the pinion 88a. The steering gear 88 is formed as a rack and pinion steering gear. The steering gear 88 converts rotational motion transmitted to the pinion 88a into linear motion by the rack 88b. The tie rod 89 is coupled to the rack 88b.

Figure 2:
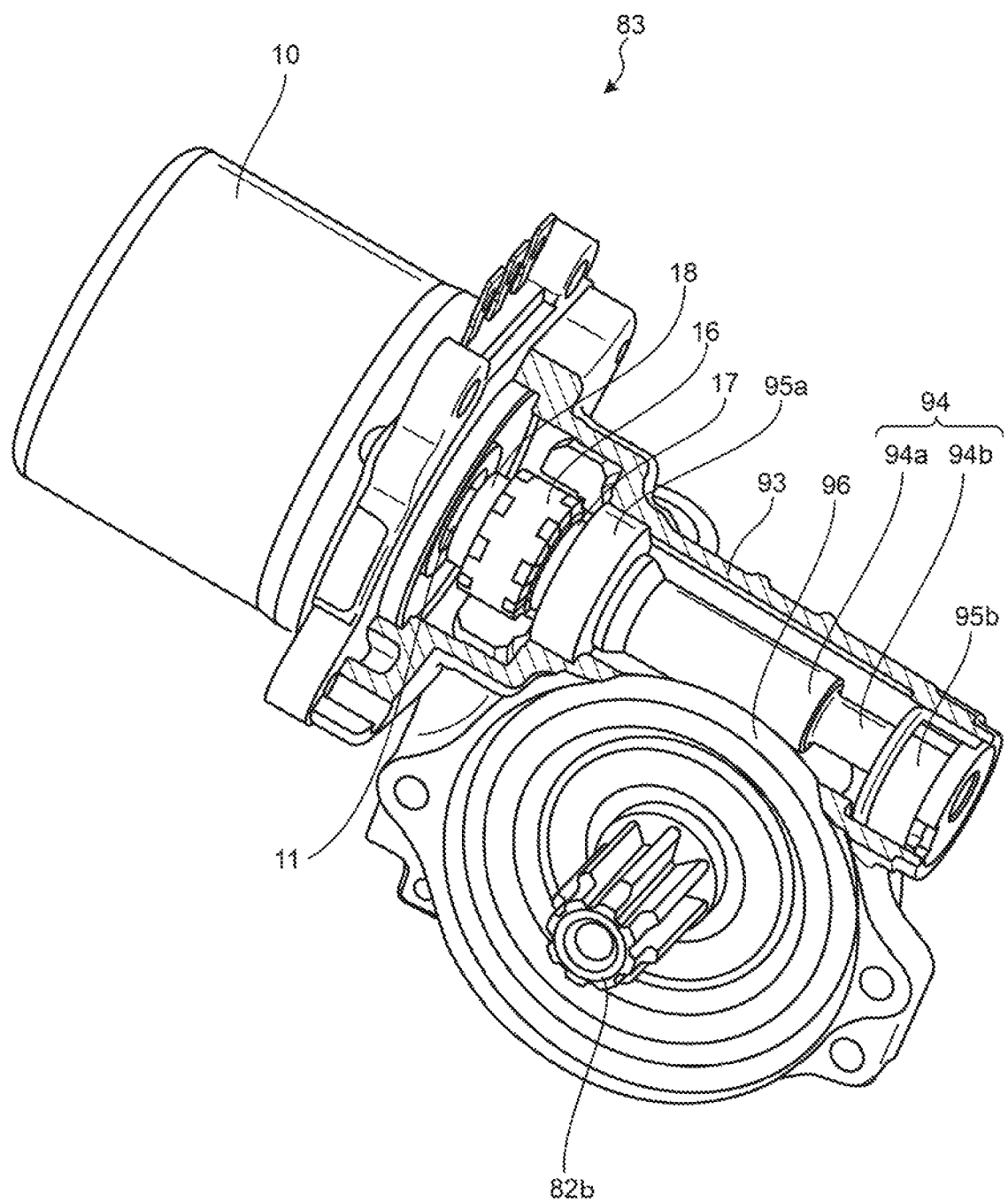
FIG. 2 is a diagram illustrating a configuration example of the assist mechanism.

FIG. 2 is a diagram illustrating a configuration example of the assist mechanism 83. FIG. 2 illustrates a diagram in which a part of a housing 93 is cut open for the purpose of illustrating an internal configuration of the housing 93. The assist mechanism 83 includes an electric motor 10, a housing 93, a worm gear shaft 94, a worm wheel 96, and a coupling 16.

The housing 93 houses the worm gear shaft 94, the worm wheel 96, and the coupling 16 therein. The electric motor 10 is fixed to the housing 93. An output shaft 11 of the electric motor 10 extends inward of the housing 93. The electric motor 10 rotationally drives the output shaft 11. The output shaft 11 is coupled to the worm gear shaft 94 through the coupling 16. When the output shaft 11 rotates, the worm gear shaft 94 rotates. The worm gear shaft 94 is engaged with the worm wheel 96. When the worm gear shaft 94 rotates, the worm wheel 96 rotates. The worm wheel 96 is fixed such that its rotation axis coincides with a rotation axis of the output shaft 82b. When the worm wheel 96 rotates, rotational driving force of the worm wheel 96 is applied to the output shaft 82b. In this manner, the assist mechanism 83 assists the rotation of the output shaft 82b with rotational driving force of the electric motor 10. In other words, the assist mechanism 83 applies, to the output shaft 82b, torque for assisting steering performed through the steering wheel 81.

In the electric power steering device 80 in the first embodiment, a steering column is formed using the steering shaft 82, the torque sensor 91a, and the assist mechanism 83. In other words, the electric power steering device 80 in the first embodiment is, for example, a column assist power steering device.

The torque sensor 91a illustrated in FIG. 1 detects steering force of a driver transmitted to the input shaft 82a through the steering wheel 81 as steering torque. The vehicle speed sensor 91b detects traveling speed of a vehicle having the electric power steering device 80 mounted thereon. The ECU 90 is electrically connected to the electric motor 10, the torque sensor 91a, and the vehicle speed sensor 91b.

The ECU 90 controls operation of the electric motor 10. The ECU 90 acquires signals from the torque sensor 91a and the vehicle speed sensor 91b. In other words, the ECU 90 acquires steering torque T from the torque sensor 91a, and acquires traveling speed V of the vehicle from the vehicle speed sensor 91b. The ECU 90 is supplied with power from a power supply device (for example, on-vehicle battery) 99 in the state in which an ignition switch 98 is turned on. The ECU 90 calculates an assist steering command value for assist command based on the steering torque T and the traveling speed V. The ECU 90 adjusts a power value X to be supplied to the electric motor 10 based on the calculated assist steering command value. The ECU 90 acquires, as operation information Y, information on induced voltage from the electric motor 10 or information on rotation of a rotor from a resolver described later.

Steering force input to the steering wheel 81 by a steerer (driver) is transmitted to the assist mechanism 83 through the input shaft 82a. In this case, the ECU 90 acquires steering torque T input to the input shaft 82a from the torque sensor 91a, and acquires traveling speed V from the vehicle speed sensor 91*b*. The ECU 90 controls the operation of the electric motor 10. Assist steering torque produced by the electric motor 10 is transmitted to the assist mechanism 83.

The steering torque T (including assist steering torque) output through the output shaft 82*b* is transmitted to the lower shaft 85 through the universal joint 84, and further transmitted to the pinion shaft 87 through the universal joint 86. The steering force transmitted to the pinion shaft 87 is transmitted to the tie rod 89 through the steering gear 88 to turn steered wheels.

Each configuration in the assist mechanism 83 is described below. The worm gear shaft 94 is a shaft-shaped member including a worm 94*a* and a rotation shaft portion 94*b*. The rotation shaft portion 94*b* in the worm gear shaft 94 is pivotally supported by bearings 95*a* and 95*b* fixed to the housing 93. The bearings 95*a* and 95*b* pivotally support the worm gear shaft 94 such that the worm gear shaft 94 is rotatable. The worm 94*a* in the worm gear shaft 94 is formed between the bearing 95*a* and the bearing 95*b*.

Figure 3:
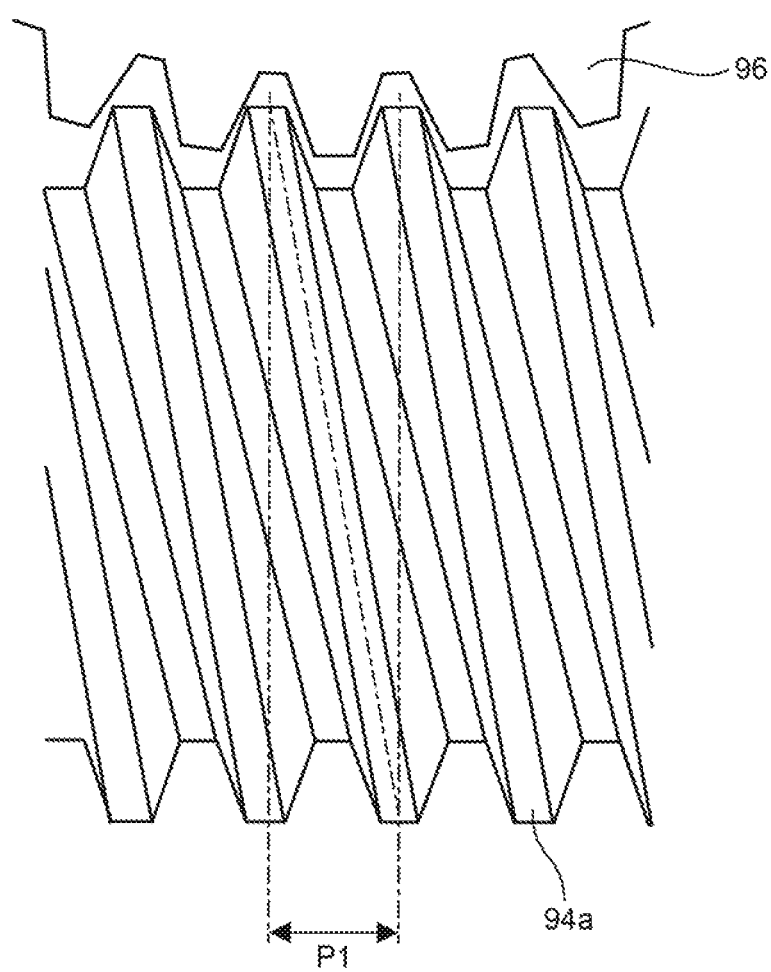
FIG. 3 is a diagram illustrating a configuration example of a worm and a worm wheel 96 in the first embodiment.

FIG. 3 is a diagram illustrating a configuration example of the worm 94*a* and the worm wheel 96 in the first embodiment. The worm 94*a* in the first embodiment is a double thread worm. In other words, as indicated by a half rotation pitch P1 in FIG. 3, gears of the worm wheel 96 are formed so as to advance by one in response to half rotation of the worm 94*a*. Thus, the gears of the worm wheel 96 advance by two in response to one rotation of the worm 94*a*.

Figure 4:
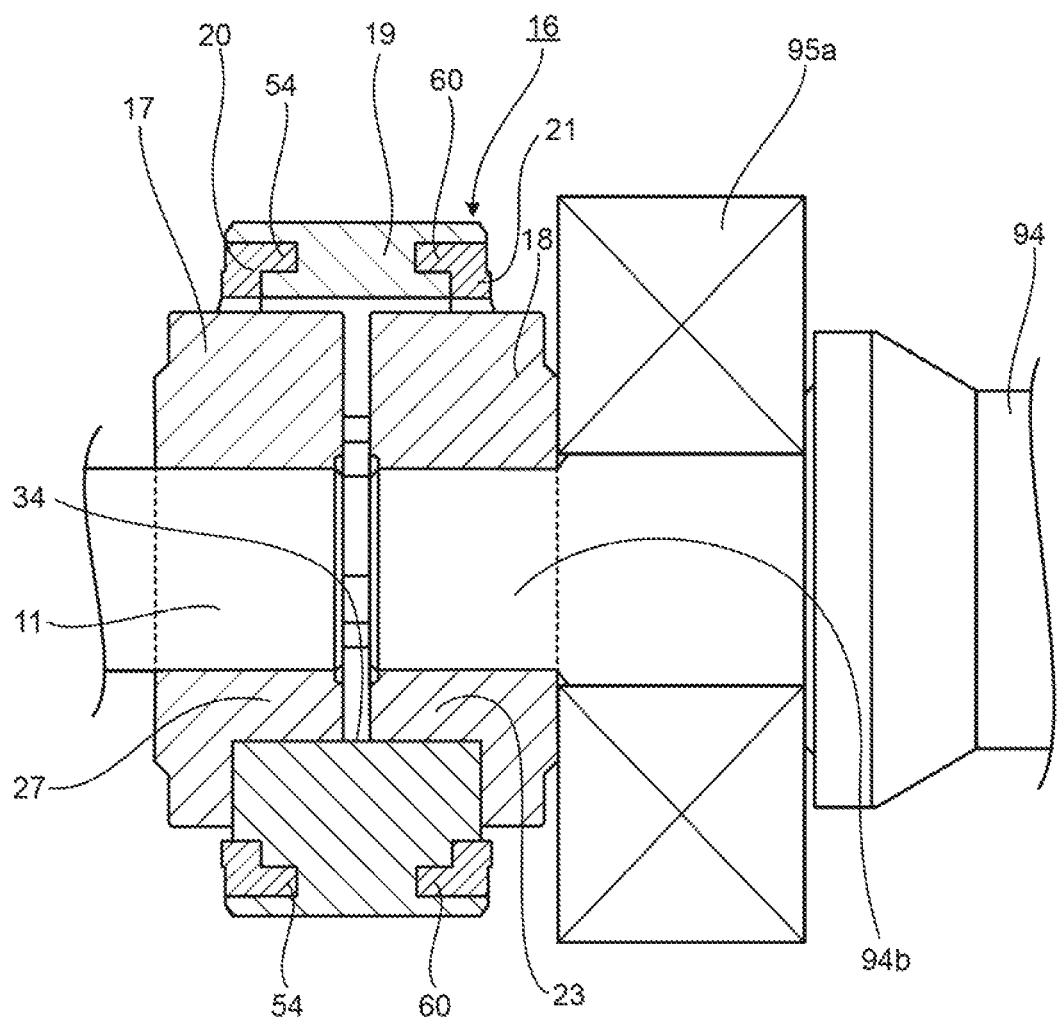
FIG. 4 is a diagram illustrating an example of a configuration near a coupling.

FIG. 4 is a diagram illustrating an example of a configuration near the coupling 16. The coupling 16 includes a first transmission member 17, a second transmission member 18, and a third transmission member 19. The first transmission member 17 is fixed to the output shaft 11. Specifically, the first transmission member 17 draws a circular ring that houses therein an end portion of the output shaft 11 extending from the electric motor 10. Ideally, the center of the circular ring of the first transmission member 17 coincides with a rotation axis center 11*a* (see FIG. 7) of the output shaft 11. The second transmission member 18 is fixed to the rotation shaft portion 94*b*. Specifically, the second transmission member 18 draws a circular ring that houses therein an end portion of the rotation shaft portion 94*b* extending from the bearing 95*a*, which is located closer to the output shaft 11 and pivotally supports the worm gear shaft 94, toward the output shaft 11. Ideally, the center of the circular ring of the second transmission member 18 coincides with a rotation axis center of the rotation shaft portion 94*b*.

Figure 5:
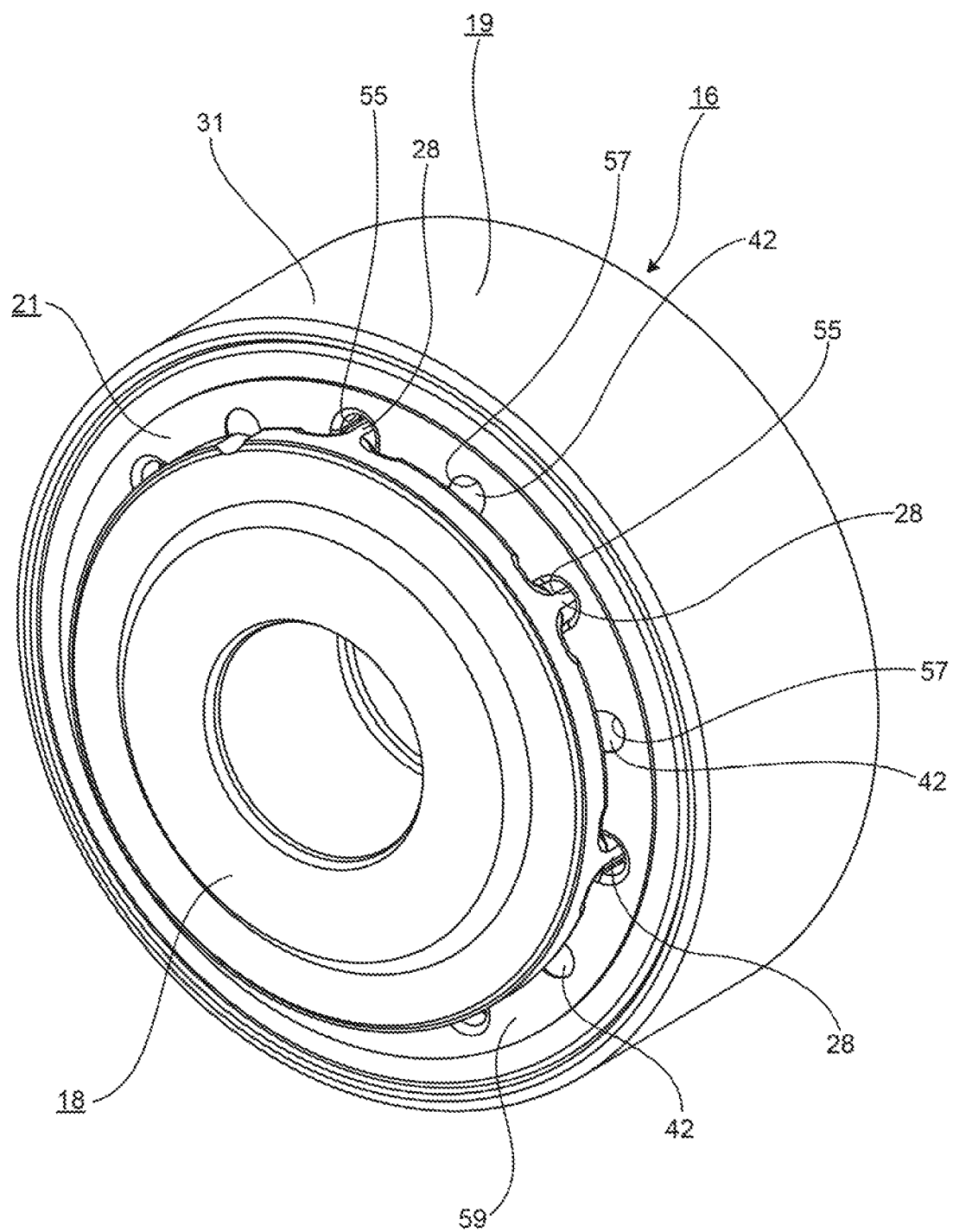
FIG. 5 is a perspective view of the coupling in the first embodiment.
Figure 6:
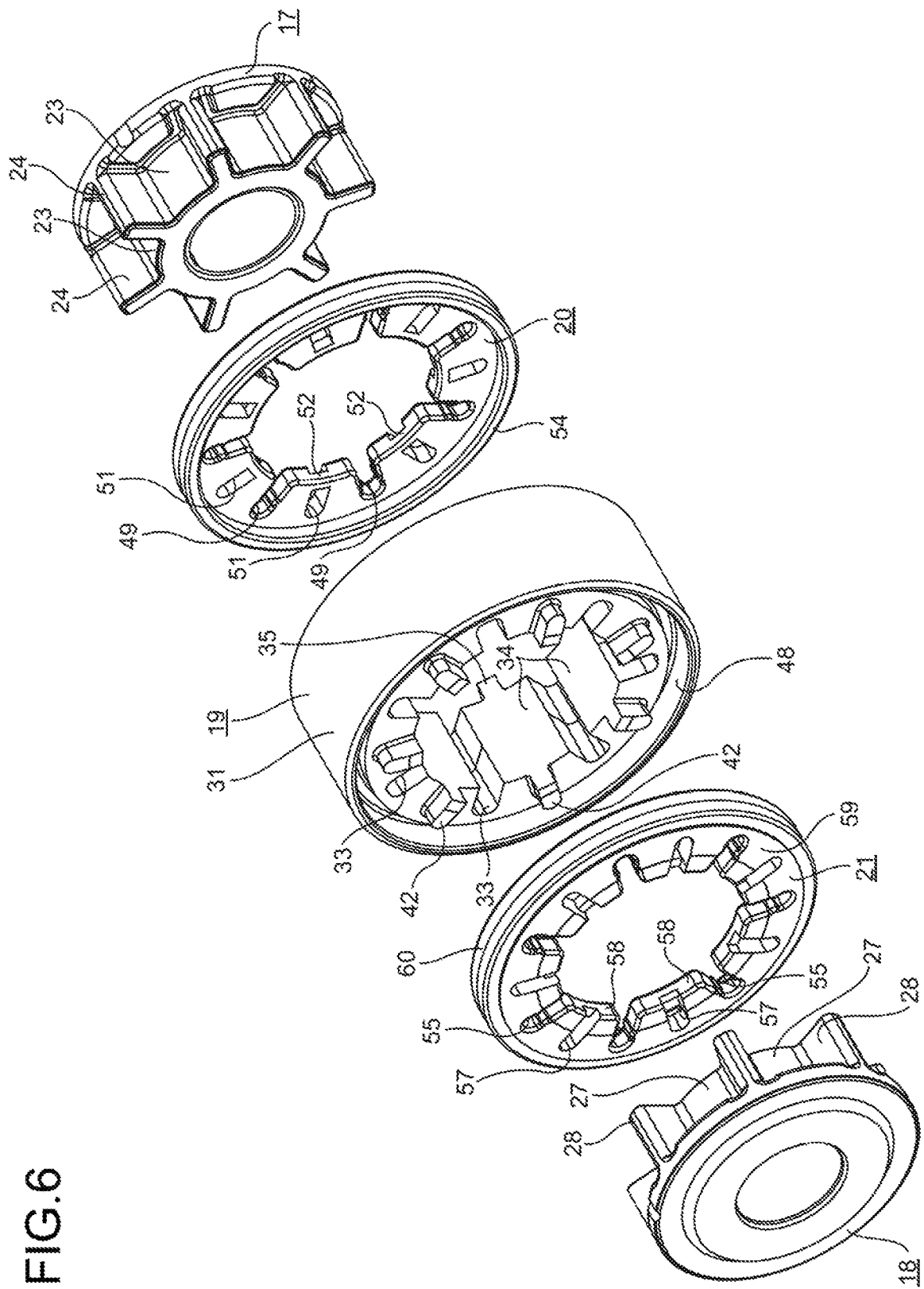
FIG. 6 is an exploded perspective view of the coupling in the first embodiment.

FIG. 5 is a perspective view of the coupling 16 in the first embodiment. FIG. 6 is an exploded perspective view of the coupling 16 in the first embodiment. The third transmission member 19 is engaged with a predetermined number of projections 24 of the first transmission member 17 and the predetermined number of projections 28 of the second transmission member 18, thereby coupling the first transmission member 17 and the second transmission member 18 to each other. Specifically, for example, the third transmission member 19 has an outer peripheral portion 31 having a diameter greater than the outer diameters of the circular rings of the first transmission member 17 and the second transmission member 18. The outer peripheral portion 31 has an outer peripheral surface having a columnar or cylindrical shape. On the inner side of the outer peripheral portion 31, an inner peripheral portion 34 having a diameter less than that of the outer peripheral portion 31 is formed. The center of a circular ring drawn by the outer peripheral portion 31 coincides with the center of a circular ring drawn by the inner peripheral portion 34. The third transmission member 19 has a cylindrical shape having a thickness of a wall surface corresponding to the difference between the outer peripheral portion 31 and the inner peripheral portion 34 or a columnar shape having a hole corresponding to the inner diameter of the inner peripheral portion 34. The center axis of the third transmission member 19 described below refers to the center axis of the cylinder or the column.

The third transmission member 19 has a plurality of recesses 33 formed radially from the inner peripheral portion 34 toward the outer peripheral portion 31. The recesses 33 are recesses bored in the inner peripheral portion 34 so as to spread radially from the center axis of the third transmission member 19. The position (depth) of an end portion of the recess 33 in the radial direction with respect to the inner peripheral portion 34 is less than the thickness of the wall surface of the third transmission member 19. The end portions of the recesses 33 are arranged circularly about the center axis of the third transmission member 19. The end portion of each of the recesses 33 in the radial direction has an arc shape, for example, but a corner may be formed.

The first transmission member 17 has a plurality of projections 24 formed radially from the center of the circular ring of the first transmission member 17 to the outer periphery. More specifically, the first transmission member 17 has a cylindrical portion 23 that surrounds the output shaft 11 fixed on the inner side thereof. The projections 24 are formed so as to extend radially outward from the outer peripheral surface of the cylindrical portion 23. In other words, the projections 24 are gear-shaped structures formed on the outer peripheral surface of the cylindrical portion 23. Each of the projections 24 is a tooth thereof. For example, end portions of the extending projections 24 are arranged along the circular ring of the first transmission member 17. The diameter of a circular ring drawn by the end portions of the projections 24 may be less than the diameter of the circular ring of the first transmission member 17. The thicknesses of the cylindrical portion 23 and the projections 24 in a rotation axis direction of the output shaft 11 are equal to or less than a half of the thickness of the third transmission member 19 in a center axis direction.

The first transmission member 17 and the second transmission member 18 have shapes mirror-symmetric with respect to the third transmission member 19. Specifically, the second transmission member 18 has a plurality of projections 28 formed radially from the center of the circular ring of the second transmission member 18 to the outer periphery. More specifically, the second transmission member 18 has a cylindrical portion 27 that surrounds the rotation shaft portion 94*b* fixed on the inner side thereof. The projections 28 are formed so as to extend radially outward from the outer peripheral surface of the cylindrical portion 27. For example, end portions of the extending projections 28 are arranged along the circular ring of the second transmission member 18. The diameter of a circular ring drawn by end portions of the projections 28 may be less than the diameter of the circular ring of the second transmission member 18. The thicknesses of the cylindrical portion 27 and the projections 28 in a rotation axis direction of the rotation shaft portion 94*b* are equal to or less than a half of the thickness of the third transmission member 19 in the center axis direction.

In the first embodiment, the number of the projections 24, the number of the projections 28, and the number of the recesses 33 are 7. The diameter of the circular ring drawn by the end portions of the projections 24 and the diameter of the circular ring drawn by the end portions of the projections 28 are equal to or less than the diameter of a circular ring drawn by the end portions of the recesses 33. The shapes of the end portions of the projections 24 and the projections 28 are shapes housed inside the recesses 33. Specifically, the shapes of the end portions of the projections 24 and the projections 28 are arc, for example, as illustrated in FIG. 4, the projections 24 and the projections 28 are fitted so as to be housed inside the recesses 33, so that the third transmission member 19 couples the first transmission member 17 and the second transmission member 18 to each other.

More specifically, in the first embodiment, margins are provided between the diameter of the circular ring drawn by the end portions of the projections 24 and the diameter of the circular ring drawn by the end portions of the recesses 33 and between the diameter of the circular ring drawn by the end portions of the projections 28 and the diameter of the circular ring drawn by the end portions of the recesses 33. This allows the first transmission member 17 and the second transmission member 18 to be coupled to each other with the third transmission member 19 therebetween in a positional relation in which the first transmission member 17 and the second transmission member 18 are not limited to be coaxial to each other. Thus, warpage of the output shaft 11 and the rotation shaft portion 94b due to misalignment of axes caused between the output shaft 11 and the rotation shaft portion 94b can be suppressed.

In the examples illustrated in FIG. 5 and FIG. 6, elastic members 20 and 21 are respectively attached to end surfaces of the cylinder (or column) of the third transmission member 19. For example, the elastic member 21 has a circular ring-shaped protruding portion 60 extending toward the third transmission member 19. The protruding portion 60 is fitted to a circular ring-shaped groove member 48 formed so as to be located between the outer peripheral portion 31 and the recesses 33 of the third transmission member 19. The elastic member 21 fitted to the third transmission member 19 is located between the second transmission member 18 and the third transmission member 19. In the elastic member 21, an inner peripheral portion 58 having a diameter equal to that of the inner peripheral portion 34 is formed. The elastic member 21 has a plurality of recesses 55 formed radially outward from the inner peripheral portion 58 in a manner similar to the recesses 33 of the third transmission member 19. The third transmission member 19 is provided with projections 42 provided so as to be located between the recesses 33 arranged circularly. The projections 42 extend from the inner peripheral portion 34 toward the rotation shaft portion 94b along the center axis direction of the third transmission member 19. In a plate surface 59 of the elastic member 21, holes 57 for fitting the projections 42 therein are formed. The positional relation between the recesses 33 and the projections 42 corresponds to the positional relation between the recesses 55 and the holes 57. In this manner, as illustrated in FIG. 5, the projections 28 are fitted so as to be housed inside the recesses 55.

The first transmission member 17 and the second transmission member 18 have shapes mirror-symmetric with respect to the third transmission member 19. The end surfaces of the cylinder (or column) of the third transmission member 19 have mirror-symmetric shapes. Specifically, the elastic member 20 has a circular ring-shaped protruding portion 54 extending toward the third transmission member 19. In the elastic member 20, an inner peripheral portion 52 having a diameter equal to that of the inner peripheral portion 34 is formed. The elastic member 20 has a plurality of recesses 49 formed radially outward from the inner peripheral portion 52 in a manner similar to the recesses 33 of the third transmission member 19. In a plate surface of the elastic member 20, holes 51 for fitting therein projections 35 extending from the inner peripheral portion 34 toward the output shaft 11 are formed. The elastic member 20 fitted to the third transmission member 19 is located between the first transmission member 17 and the third transmission member 19, and the projections 24 are fitted so as to be housed inside the recesses 49.

The first transmission member 17 and the second transmission member 18 are formed from synthetic resin mixed with reinforced fibers as needed, or metal such as an iron alloy, a copper alloy, or an aluminum alloy. The first transmission member 17 and the second transmission member 18 are formed into a circular ring shape as a whole by a method such as injection molding, casting, forging, sintering, or cutting. The first transmission member 17 is externally fitted and fixed to the output shaft 11 by interference fitting, spline fitting, or swaging in the state in which relative rotation and axial relative displacement are prevented. The first transmission member 17 may be formed integrally with the output shaft 11. The second transmission member 18 is externally fitted and fixed to the rotation shaft portion 94b by interference fitting, spline fitting, or swaging in the state in which relative rotation and axial relative displacement are prevented. The second transmission member 18 may be formed integrally with the rotation shaft portion 94b.

The third transmission member 19 is formed from material having rigidity higher than that of elastic material forming the elastic member 20 and the elastic member 21. For example, the third transmission member 19 is formed from belt material obtained by reinforcing rubber by cloth, synthetic resin (such as PPS, PEEK, and polyamide) mixed with reinforced fibers as needed, or metal such as an iron alloy, a copper alloy, or an aluminum alloy. The third transmission member 19 is formed into a cylindrical (or columnar) shape by a method such as injection molding, casting, forging, sintering, or cutting.

The elastic members 20 and 21 are formed from elastic material having rigidity lower than that of the third transmission member 19. For example, the elastic members 20 and 21 are formed into a circular ring shape as a whole using elastic material such as rubber (such as NBR and HNBR) or an elastomer (such as polyurethane and silicon).

The elastic member 20 and the elastic member 21 are formed from elastic material, thereby further enhancing the tolerance to allow the first transmission member 17 and the second transmission member 18 to be coupled to each other with the elastic members 20 and 21 therebetween in a positional relation in which the first transmission member 17 and the second transmission member 18 are not limited to be coaxial to each other. The third transmission member 19 is formed from material having rigidity higher than that of the elastic members 20 and 21, for example, synthetic resin, thereby enhancing, due to elasticity, the tolerance to allow the first transmission member 17 and the second transmission member 18 to be coupled to each other in a positional relation in which the first transmission member 17 and the second transmission member 18 are not limited to be coaxial to each other.

Figure 7:
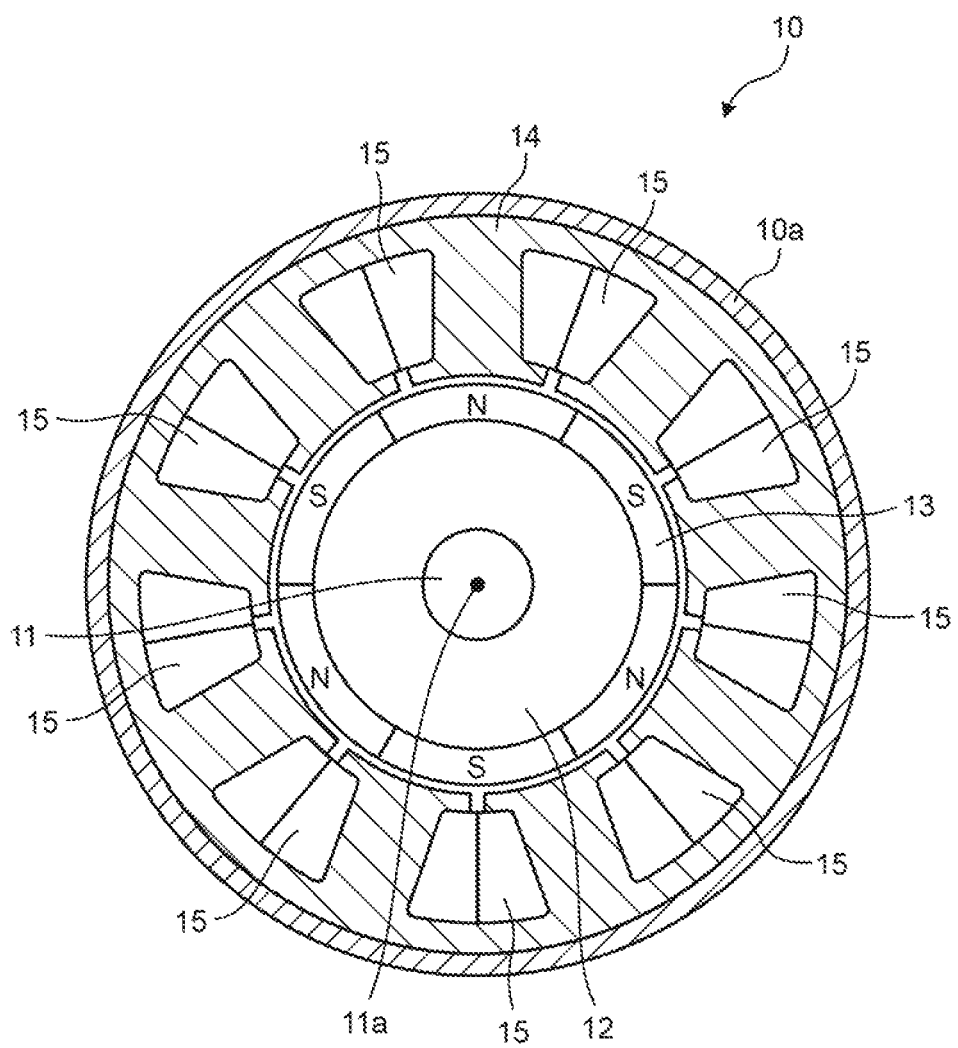
FIG. 7 is a diagram illustrating a configuration example of an electric motor in the first embodiment.

FIG. 7 is a diagram illustrating a configuration example of the electric motor 10 in the first embodiment. The electric motor 10 includes a rotor 12 and a stator 14. The electric motor 10 illustrated in FIG. 7 is provided with the stator 14 on the outer peripheral side of the rotor 12. The rotor 12 has a multipolar magnet 13 provided on the outer peripheral side. The stator 14 has a plurality of windings 15 provided on the inner side of a casing 10a of the electric motor 10. For example, the windings 15 are wound around grooves (slots)

provided in the stator 14. The rotor 12 rotates about the output shaft 11 in response to energization of the windings 15.

The number of poles of the magnet 13 in the first embodiment is 6. In other words, three N poles and three S poles are alternatingly disposed circularly at intervals of 60 degrees about the rotation axis center 11a. The number of the windings 15 in the first embodiment is 9. The electric motor 10 in the first embodiment is what is called a "6-pole 9-slot" motor.

The smallest rotation order among rotation orders of the electric motor 10 and the rotation order of the worm 94a are prime to each other. The smallest rotation order among the rotation orders of the electric motor 10 and the rotation order of the coupling 16 are prime to each other. The rotation order of the worm 94a and the rotation order of the coupling 16 are prime to each other. The rotation order is the number (integer) of periodic components appearing per rotation of a rotating body. For example, a component that appears as one period per rotation of a rotating body is called a 1st order. In other words, the rotation order of a rotating body in which a component appears as one period is 1. Similarly, a component that appears n periods per rotation of a rotating body is called an n-th order (n is an integer of 0 or greater). The rotation order of a rotating body in which a component appears as n periods is n.

When a multiplication of two natural numbers other than 1 expresses the number of poles of the magnet 13 in the rotor 12, the rotation order of the electric motor 10 is n times a larger natural number of the two natural numbers. n is a natural number of 1 or greater. The number of poles of the magnet 13 in the rotor 12 is 6 and can be expressed as 6=2×3. Thus, in the first embodiment, when a multiplication (2×3) of two natural numbers other than 1 expresses the number of poles (6) of the magnet 13, a larger natural number of the two natural numbers (2,3) is 3. The rotation order of the worm 94a is the number of teeth of the worm wheel 96 that advance in response to one rotation of the worm gear shaft 94. In other words, the rotation order of the worm 94a in the first embodiment is 2. The rotation order of the coupling 16 is the respective numbers of projections 24 and 28 of the first transmission member 17 and the second transmission member 18. In other words, the rotation order of the coupling 16 in the first embodiment is 7.

When the smallest rotation order among rotation orders of an electric motor such as the electric motor 10 is A, the rotation order of a worm such as the worm 94a is B, and the rotation order of a coupling such as the coupling 16 is C, A:B:C=3:2:7 is established in the first embodiment. The electric motor 10, a worm gear including the worm 94a and the worm wheel 96, and the coupling 16 may cause vibration with periods corresponding to the rotation orders indicated by A, B, and C, respectively.

Ideally, it is desired that a rotating body have a uniform weight distribution over the entire circumference about its rotation axis in order to prevent vibration caused by rotation of the rotating body. Actually, however, it is difficult to completely eliminate errors and deviation in the weight distribution in processes of the formation of shapes, the assembly, etc. Thus, vibration can occur due to errors and deviation in weight distribution. In the case of the electric motor 10, vibration can occur due to errors and deviation depending on the number of poles of the magnet 13. In the case of the worm gear, vibration can occur due to errors and deviation in teeth of the worms 94a and 96. In the case of the coupling 16, vibration can occur due to errors and deviation in the arrangement and the shapes (such as thickness) of the projections 24 and 28. It is difficult to form the worm gear shaft 94 to be completely linear. Thus, vibration (1st order variation) can occur due to distortion of the worm gear shaft 94 with respect to the ideal rotation axis center. The m-th order variation (m is a natural number) refers to load variation that occurs with a period that is m times the period of one rotation of the output shaft of the electric motor. The load variation can be a cause of vibration. When the smallest r among the r-th order variations caused in a rotating body is m, m is equal to the rotation order of the rotating body.

In the first embodiment, these rotation orders A, B, and C are prime to one another, and hence the periods of vibrations are less easily overlap. In other words, the possibility that vibrations of a plurality of configurations occurs at the same timing to amplify the vibration is reduced. In this manner, by setting the rotation orders of configurations, which rotate in response to one rotation of the output shaft 11, or one rotation of the worm gear shaft 94, to be prime to each other, load variation, vibration, and noise caused by vibration in the assist mechanism 83 can be reduced.

Figure 8:
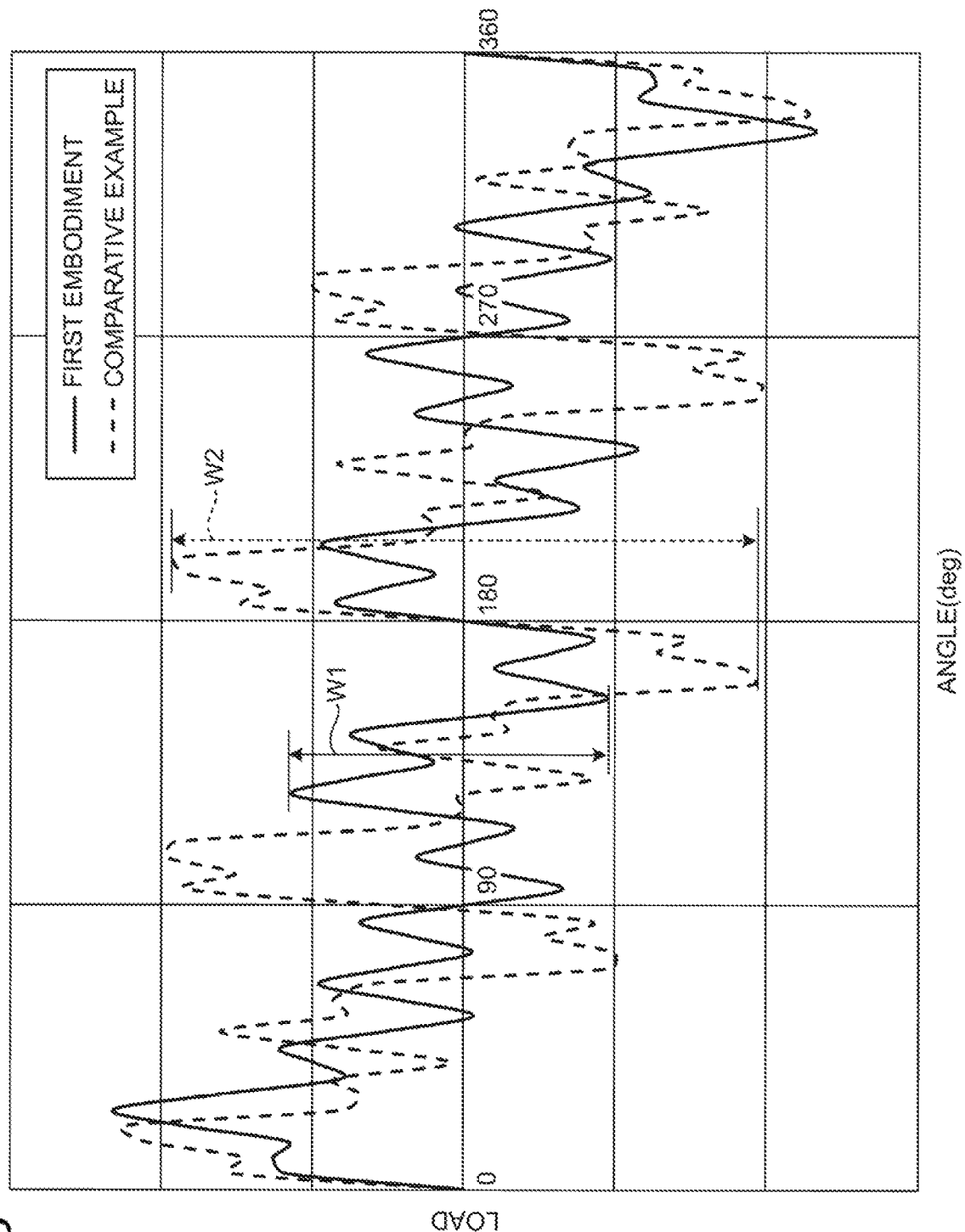
FIG. 8 is a conceptual graph illustrating load variation that occurs in a period during which a worm gear shaft rotates one turn, in an assist mechanism of the first embodiment.

FIG. 8 is a conceptual graph illustrating load variation that occurs in the assist mechanism 83 in a period during which the worm gear shaft 94 rotates one turn in the first embodiment. This load variation is, for example, load variation caused in the bearing 95a, which pivotally supports the worm gear shaft 94 and is located closer to the output shaft 11 of the electric motor 10, among the bearings 95a and 95b that pivotally support the worm gear shaft 94. FIG. 8 illustrates an example of load variation in the electric power steering device 80 including the assist mechanism 83 in the first embodiment and load variation in an electric power steering device including an assist mechanism in a comparative example. In the comparative example, unlike the present embodiment, the smallest rotation order among rotation orders of the electric motor 10, the rotation order of the worm 94a, and the rotation order of the coupling 16 are not prime to one another. Specifically, the relation of A:B:C=4:2:8 is established in the comparative example. More specifically, the electric motor in the comparative example is, for example, an 8-pole 12-slot electric motor.

The electric motor of the comparative example is an 8-pole 12-slot electric motor in which A=4 is established. Thus, the electric motor causes 4th order variation, 8th order variation, and 24th order variation in response to one rotation of the output shaft of the electric motor. In the comparative example, B=2 is established. Thus, the worm gear causes 2nd order variation and 4th order variation in response to one rotation of the output shaft of the electric motor. In the comparative example, C=8 is established. Thus, the coupling causes 8th order variation in response to one rotation of the output shaft of the electric motor. The state in which 8th order variation occurs corresponds to the state in which load variation overlapping 2nd order variation and 4th order variation occurs. The state in which 4th order variation occurs corresponds to the state in which load variation overlapping 2nd order variation occurs. Thus, in the comparative example, as indicated by a load variation width W2, all load variations in the electric motor, the worm gear, and the coupling overlap at timing of half rotation (180°), and a particularly large load variation occurs.

The electric motor of the first embodiment is, on the other hand, a 6-pole 9-slot electric motor in which A=3 is established. Thus, the electric motor 10 causes 3rd order variation, 6th order variation, and 18th order variation in response to one rotation of the output shaft 11. In the first embodiment, B=2 is established. Thus, the worm gear causes 2nd order variation and 4th order variation in response to one rotation of the output shaft 11. In the first embodiment, C=7 is established. Thus, the coupling 16 causes 7th order variation in response to one rotation of the output shaft of the output shaft 11. Accordingly, in the first embodiment, load variations in the electric motor 10, the worm gear, and the coupling 16 extremely hardly overlap. Thus, even if a large load variation among load variations caused in the first embodiment is picked up, the load variation can be reduced to about a load variation width W1 smaller than the load variation width W2.

In the case of the column assist system, vibration and noise caused by assist operation of steering tends to relatively affect the vehicle interior, but according to the first embodiment, load variation, vibration, and noise can be reduced, and hence the influence of vibration and noise on the vehicle interior can be reduced. Even in environments where vibration and noise are more conspicuous due to relatively high silence of the vehicle such as an electric vehicle and a hybrid car, the influence of vibration and noise on the vehicle interior can be reduced. The influence by vibration and noise in a configuration whose rotation order is predetermined can be reduced, and hence when vibration and noise occur for some reason, the vibration and the noise can be easily detected. Thus, countermeasures for reducing the vibration and the noise can be easily taken.

As described above, according to the first embodiment, the rotation orders of the electric motor 10, the worm gear, and the coupling 16 can be made different to shift their timings of occurrence of vibration and noise. This can prevent larger vibration and noise, which would otherwise be caused due to a synergistic effect created by concurrence of vibrations and noises of these configurations. Thus, vibration and noise can be reduced.

The rotation orders of the electric motor 10, the worm gear, and the coupling 16 can be specified based on the number of configurations that move at positions away from the respective rotation axes along with the rotations of the electric motor 10, the worm gear, and the coupling 16, and the rotation orders can be made different. Therefore, their timings of occurrence of vibration and noise can be shifted. This can more reliably prevent larger vibration and noise, which would otherwise be caused due to a synergistic effect created by concurrence of vibrations and noises of these configurations. Thus, vibration and noise can be more reliably reduced.

By setting A:B:C=3:2:7, all the rotation orders of the electric motor, the worm, and the coupling can be made different. This can more reliably prevent larger vibration and noise, which would otherwise be caused due to a synergistic effect created by concurrence of vibrations and noises of these configurations. Thus, vibration and noise can be more reliably reduced.

The rotation order of the coupling 16 can be made difficult to be equal to the rotation orders of other configurations. This can more reliably prevent larger vibration and noise, which would otherwise be caused due to a synergistic effect created by concurrence of vibrations and noises of these configurations. Thus, vibration and noise can be more reliably reduced.

Modification

Figure 9:
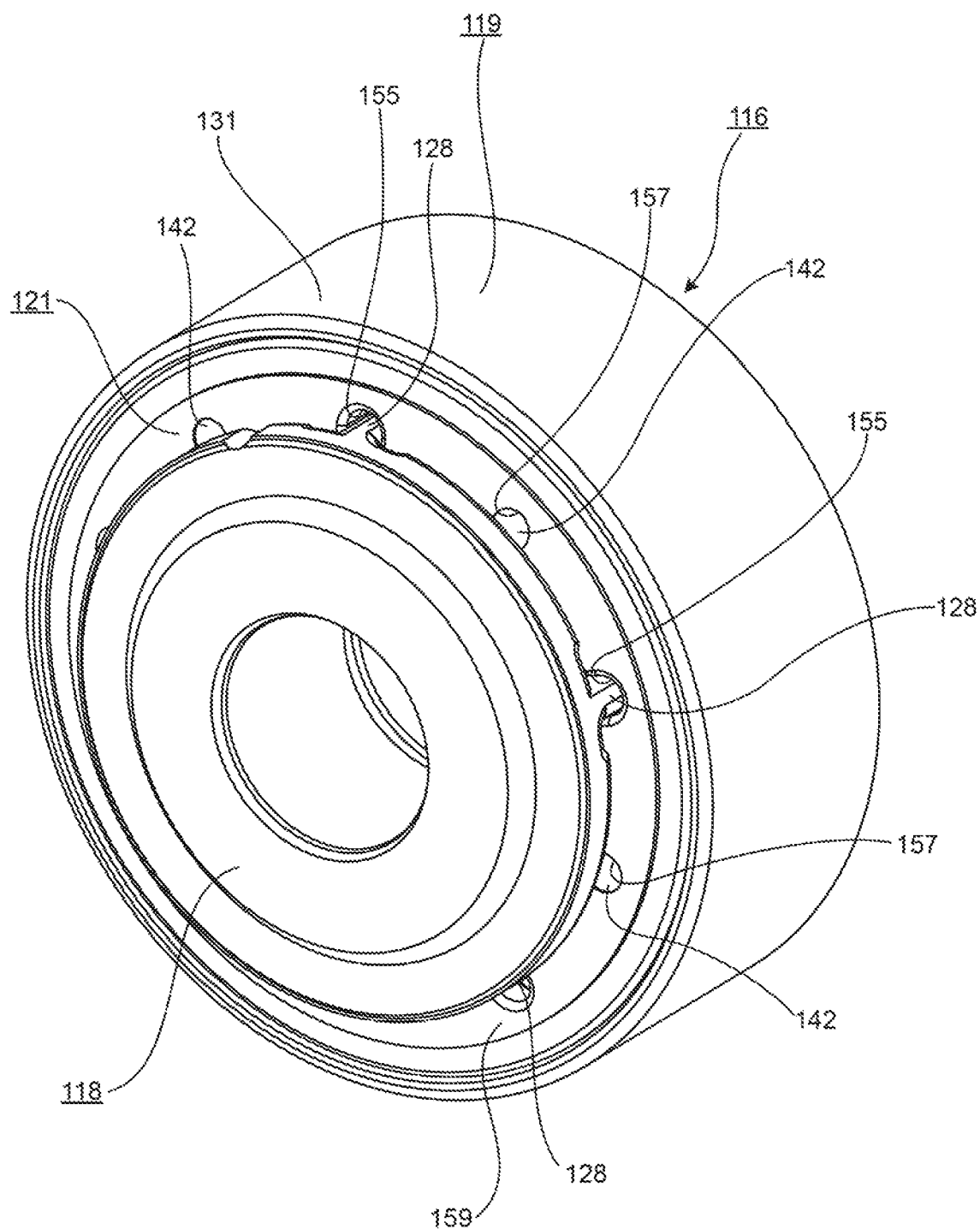
FIG. 9 is a perspective view of a coupling in a modification.
Figure 10:
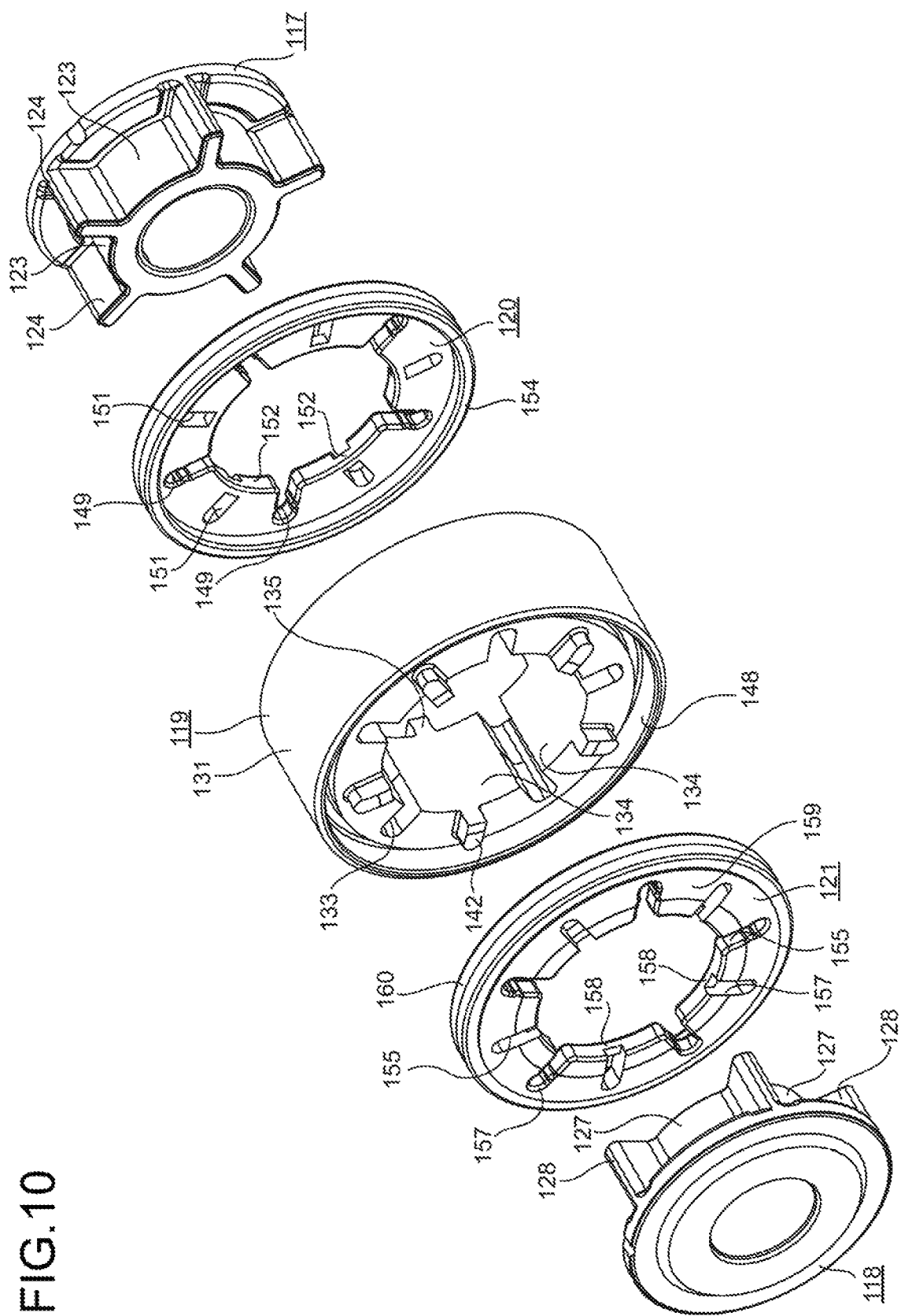
FIG. 10 is an exploded perspective view of the coupling in the modification.

Next, a modification of the first embodiment is described with reference to FIG. 9 and FIG. 10. FIG. 9 is a perspective view of a coupling 116 in the modification. FIG. 10 is an exploded perspective view of the coupling 116 in the modification. In the modification, the coupling 116 is employed instead of the coupling 16 in the first embodiment. The coupling 116 includes a first transmission member 117, a second transmission member 118, and a third transmission member 119. The third transmission member 119 is engaged with five projections 124 of the first transmission member 117 and five projections 128 of the second transmission member 118, thereby coupling the first transmission member 117 and the second transmission member 118 together. The rotation order of the coupling 116 in the modification is 5. The configurations of an assist mechanism and an electric power steering device in the modification are the same as in the first embodiment except for the difference between the coupling 16 and the coupling 116. In other words, in the modification, A:B:C=3:2:5 is established. In this manner, in the modification, the smallest rotation order among rotation orders of the electric motor 10, the rotation order of the worm 94a, and the rotation order of the coupling 116 are prime to one another.

The electric motor of the modification is a 6-pole 9-slot electric motor in which A=3 is established as in the case of the first embodiment. Thus, the electric motor 10 causes 3rd order variation, 6th order variation, and 18th order variation in response to one rotation of the output shaft 11. In the modification, B=2 is established as in the case of the first embodiment. Thus, the worm gear causes 2nd order variation and 4th order variation in response to one rotation of the output shaft 11. In the modification, C=5 is established. Thus, the coupling 116 causes 5th order variation in response to one rotation of the output shaft of the output shaft 11. In this manner, in the first embodiment, load variations in the electric motor 10, the worm gear, and the coupling 116 extremely hardly overlap. Thus, according to the modification, load variation, vibration, and noise can be reduced.

Specifically, for example, the third transmission member 119 has an outer peripheral portion 131 having a diameter greater than the outer diameters of the circular rings of the first transmission member 117 and the second transmission member 118. The outer peripheral portion 131 has an outer peripheral surface having a columnar or cylindrical shape. On the inner side of the outer peripheral portion 131, an inner peripheral portion 134 having a diameter less than that of the outer peripheral portion 131 is formed. The center of a circular ring drawn by the outer peripheral portion 131 coincides with the center of a circular ring drawn by the inner peripheral portion 134. The third transmission member 119 has a cylindrical shape having a thickness of a wall surface corresponding to the difference between the outer peripheral portion 131 and the inner peripheral portion 134 or a columnar shape having a hole corresponding to the inner diameter of the inner peripheral portion 134. The center axis of the third transmission member 119 described below refers to the center axis of the cylinder or the column.

The third transmission member 119 has a plurality of recesses 133 formed radially from the inner peripheral portion 134 toward the outer peripheral portion 131. The recesses 133 are recesses bored in the inner peripheral portion 134 so as to spread radially from the center axis of the third transmission member 119. The position (depth) of an end portion of the recess 133 in the radial direction with respect to the inner peripheral portion 134 is less than the thickness of the wall surface of the third transmission member 119. The end portions of the recesses 133 are arranged circularly about the center axis of the third transmission member 119. The end portion of each of the recesses 133 in the radial direction has an arc shape, for example, but a corner may be formed.

The first transmission member 117 has a plurality of projections 124 formed radially from the center of the circular ring of the first transmission member 117 to the outer periphery. More specifically, the first transmission member 117 has a cylindrical portion 123 that surrounds the output shaft 11 fixed on the inner side thereof. The projections 124 are formed so as to extend radially outward from the outer peripheral surface of the cylindrical portion 123. For example, end portions of the extending projections 124 are arranged along the circular ring of the first transmission member 117. The diameter of a circular ring drawn by the end portions of the projections 124 may be less than the diameter of the circular ring of the first transmission member 117. The thicknesses of the cylindrical portion 123 and the projections 124 in a rotation axis direction of the output shaft 11 are equal to or less than a half of the thickness of the third transmission member 119 in a center axis direction.

The first transmission member 117 and the second transmission member 118 have shapes mirror-symmetric with respect to the third transmission member 119. Specifically, the second transmission member 118 has a plurality of projections 128 formed radially from the center of the circular ring of the second transmission member 118 to the outer periphery. More specifically, the second transmission member 118 has a cylindrical portion 127 that surrounds the rotation shaft portion 94b fixed on the inner side thereof. The projections 128 are formed so as to extend radially outward from the outer peripheral surface of the cylindrical portion 127. For example, end portions of the extending projections 128 are arranged along the circular ring of the second transmission member 118. The diameter of a circular ring drawn by the end portions of the projections 128 may be less than the diameter of the circular ring of the second transmission member 118. The thicknesses of the cylindrical portion 127 and the projections 128 in a rotation axis direction of the rotation shaft portion 94b are equal to or less than a half of the thickness of the third transmission member 119 in the center axis direction.

In the modification, the number of the projections 124, the number of the projections 128, and the number of the recesses 133 are 5. The diameter of the circular ring drawn by the end portions of the projections 124 and the diameter of the circular ring drawn by the end portions of the projections 128 are equal to or less than the diameter of a circular ring drawn by the end portions of the recesses 133. The shapes of the end portions of the projections 124 and the projections 128 are shapes housed inside the recesses 133. Specifically, the shapes of the end portions of the projections 124 and the projections 128 are arc, for example. As illustrated in FIG. 9, the projections 124 and the projections 128 are fitted so as to be housed inside the recesses 133, so that the third transmission member 119 couples the first transmission member 117 and the second transmission member 118 to each other.

More specifically, in the modification, margins are provided between the diameter of the circular ring drawn by the end portions of the projections 124 and the diameter of the circular ring drawn by the end portions of the recesses 133 and between the diameter of the circular ring drawn by the end portions of the projections 128 and the diameter of the circular ring drawn by the end portions of the recesses 133. This allows the first transmission member 117 and the second transmission member 118 to be coupled to each other with the third transmission member 119 therebetween in a positional relation in which the first transmission member 117 and the second transmission member 118 are not limited to be coaxial to each other. Thus, warpage of the output shaft 11 and the rotation shaft portion 94b due to misalignment of axes caused between the output shaft 11 and the rotation shaft portion 94b can be suppressed.

In the examples illustrated in FIG. 9 and FIG. 10, elastic members 120 and 121 are respectively attached to end surfaces of the cylinder (or column) of the third transmission member 119. For example, the elastic member 121 has a circular ring-shaped protruding portion 160 extending toward the third transmission member 119. The protruding portion 160 is fitted to a circular ring-shaped groove 148 formed so as to be located between the outer peripheral portion 131 and the recesses 133 of the third transmission member 119. The elastic member 121 fitted to the third transmission member 119 is located between the second transmission member 118 and the third transmission member 119. In the elastic member 121, an inner peripheral portion 158 having a diameter equal to that of the inner peripheral portion 134 is formed. The elastic member 121 has a plurality of recesses 155 formed radially outward from the inner peripheral portion 158 in a manner similar to the recesses 133 of the third transmission member 119. The third transmission member 119 is provided with projections 142 provided so as to be located between the recesses 133 arranged circularly. The projections 142 extend from the inner peripheral portion 134 toward the rotation shaft portion 94b along the center axis direction of the third transmission member 119. In a plate surface 159 of the elastic member 121, holes 157 for fitting the projections 142 therein are formed. The positional relation between the recesses 133 and the projections 142 corresponds to the positional relation between the recesses 155 and the holes 157. In this manner, as illustrated in FIG. 9, the projections 128 are fitted so as to be housed inside the recesses 155.

The first transmission member 117 and the second transmission member 118 have shapes mirror-symmetric with respect to the third transmission member 119. The end surfaces of the cylinder (or column) of the third transmission member 119 have mirror-symmetric shapes. Specifically, the elastic member 120 has a circular ring-shaped protruding portion 154 extending toward the third transmission member 119. In the elastic member 120, an inner peripheral portion 152 having a diameter equal to that of the inner peripheral portion 134 is formed. The elastic member 120 has a plurality of recesses 149 formed radially outward from the inner peripheral portion 152 in a manner similar to the recesses 133 of the third transmission member 119. In a plate surface of the elastic member 120, holes 151 for fitting therein projections 135 extending from the inner peripheral portion 134 toward the output shaft 11 are formed. The elastic member 120 fitted to the third transmission member 119 is located between the first transmission member 117 and the third transmission member 119, and the projections 124 are fitted so as to be housed inside the recesses 149.

The materials and the forming methods of the first transmission member 117, the second transmission member 118, the third transmission member 119, and the elastic members 120 and 121 may be the same as those of the first transmission member 17, the second transmission member 18, the third transmission member 19, and the elastic members 20 and 21, respectively.

Second Embodiment

Figure 11:
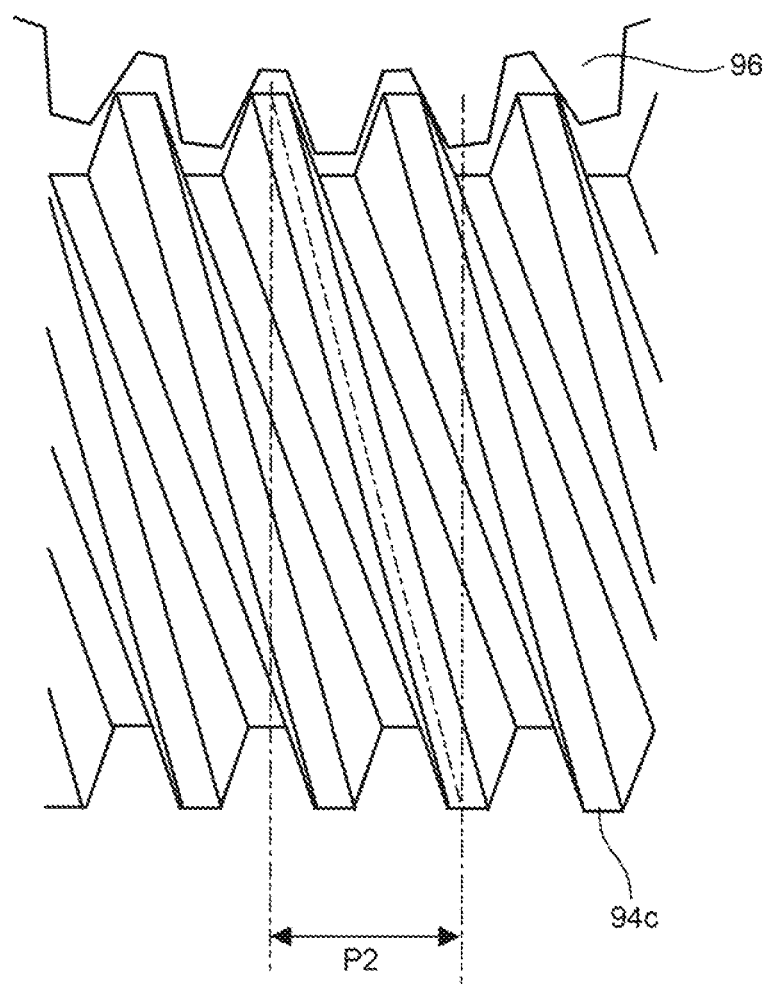
FIG. 11 is a diagram illustrating a configuration example of a worm and a worm wheel in a second embodiment.

Next, a second embodiment is described with reference to FIG. 11 and FIG. 12. FIG. 11 is a diagram illustrating a configuration example of a worm 94c and a worm wheel 96 in the second embodiment. A worm gear shaft 94 in the second embodiment has the worm 94c instead of the worm 94a. The worm 94c is a triple thread worm. In other words, as indicated by a half rotation pitch P2 in FIG. 11, gears of the worm wheel 96 are formed so as to advance by 1.5 in response to half rotation of the worm 94c. Thus, the gears of the worm wheel 96 advance by three in response to one rotation of the worm 94a. Thus, the rotation order of the worm 94c is 3.

Figure 12:
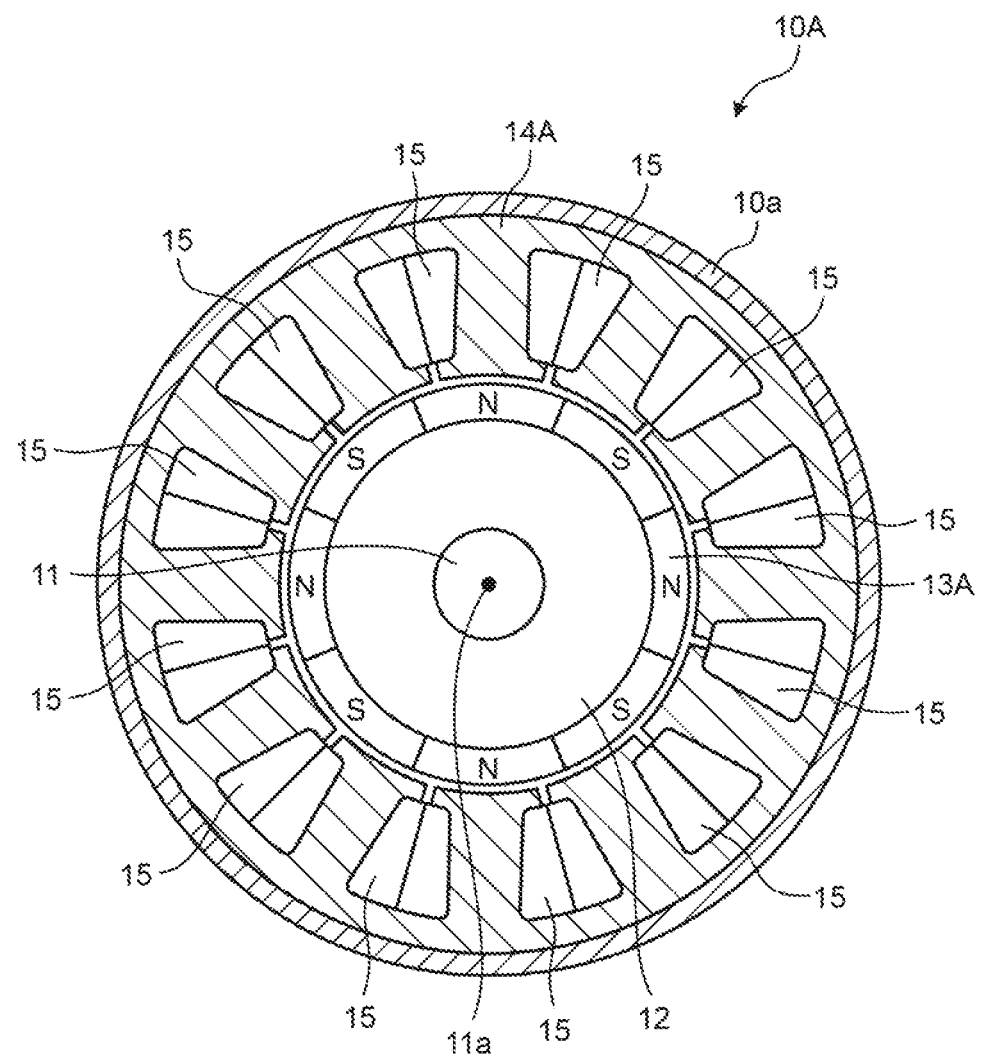
FIG. 12 is a diagram illustrating a configuration example of an electric motor in the second embodiment.

FIG. 12 is a diagram illustrating a configuration example of an electric motor 10A in the second embodiment. The electric motor 10A in the second embodiment includes a magnet 13A and a stator 14A instead of the magnet 13 and the stator 14 included in the electric motor 10 in the first embodiment. The electric motor 10A has the same configuration as that of the electric motor 10 except for the difference between the magnet 13 and the magnet 13A and the difference between the stator 14 and the stator 14A. The magnet 13 and the magnet 13A have the same configuration except for the number of poles of the magnet. The stator 14 and the stator 14A have the same configuration except for the number of windings 15 and the number of grooves provided with the windings 15.

The number of poles of the magnet 13A in the second embodiment is 8. In other words, four N poles and four S poles are alternatingly disposed circularly at intervals of 45 degrees about the rotation axis center 11a. The number of windings 15 in the second embodiment is 12. The electric motor 10A in the second embodiment is what is called a "8-pole 12-slot" motor. That is, the number of poles of the magnet 13A can be expressed as 8=2×4. Thus, in the second embodiment, when a multiplication of two natural numbers other than 1 expresses the number of poles of the magnet 13A, the larger natural number of the two natural numbers is 4.

The configurations of an assist mechanism and an electric power steering device in the second embodiment are the same as in the first embodiment except for the points described above. In other words, in the second embodiment, A:B:C=4:3:7 is established. In this manner, in the second embodiment, the smallest rotation order among rotation orders of the electric motor 10A, the rotation order of the worm 94c, and the rotation order of the coupling 16 are prime to one another.

The second embodiment is an 8-pole 12-slot electric motor in which A=4 is established. Thus, the electric motor 10A causes 4th order variation, 8th order variation, and 24th order variation in response to one rotation of the output shaft 11. In the second embodiment, B=3 is established. Thus, the worm gear causes 3rd order variation and 6th order variation in response to one rotation of the output shaft 11. In the second embodiment, C=7 is established. Thus, the coupling 16 causes 7th order variation in response to one rotation of the output shaft of the output shaft 11. In this manner, in the second embodiment, load variations in the electric motor 10A, the worm gear, and the coupling 16 extremely hardly overlap. Thus, according to the second embodiment, load variation, vibration, and noise can be reduced.

In the second embodiment, the modification may be applied as in the case of the first embodiment. In other words, in the second embodiment, the coupling 116 may be employed instead of the coupling 16. In this case, A:B:C=4:3:5 is established. In this manner, also in the modification of the second embodiment, the smallest rotation order among rotation orders of the electric motor 10A, the rotation order of the worm 94c, and the rotation order of the coupling 116 are prime to one another. Thus, according to the modification of the second embodiment, load variation, vibration, and noise can be reduced.

Third Embodiment

Figure 13:
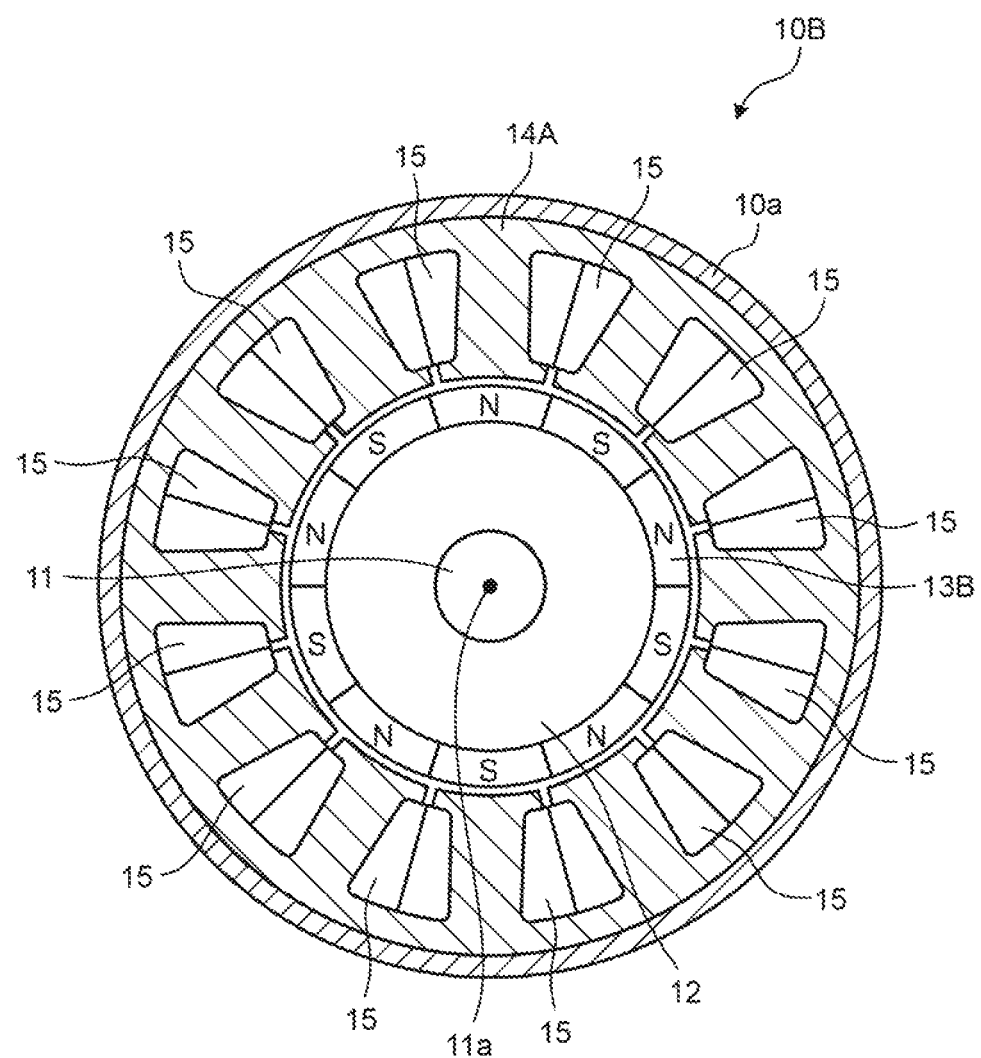
FIG. 13 is a diagram illustrating a configuration example of an electric motor in a third embodiment.

Next, a third embodiment is described with reference to FIG. 13. FIG. 13 is a diagram illustrating a configuration example of an electric motor 10B in the third embodiment. The electric motor 10B in the third embodiment includes a magnet 13B instead of the magnet 13A included in the electric motor 10A in the second embodiment. The electric motor 10B has the same configuration as that of the electric motor 10A except for the difference between the magnet 13A and the magnet 13B. The magnet 13A and the magnet 13B have the same configuration except for the number of poles of the magnet.

The number of poles of the magnet 13B in the third embodiment is 10. In other words, five N poles and five S poles are alternatively disposed circularly at intervals of 36 degrees about the rotation axis center 11a. The electric motor 10B in the third embodiment is what is called a "10-pole 12-slot" motor. That is, the number of poles of the magnet 13B can be expressed as 10=2×5. Thus, in the third embodiment, when a multiplication of two natural numbers other than 1 expresses the number of poles of the magnet 13B, the larger natural number of the two natural numbers is 5.

The configurations of an assist mechanism and an electric power steering device in the third embodiment are the same as in the first embodiment except for the points described above. In other words, in the third embodiment, A:B:C=5:2:7 is established. In this manner, in the third embodiment, the smallest rotation order among rotation orders of the electric motor 10B, the rotation order of the worm 94a, and the rotation order of the coupling 16 are prime to one another.

The third embodiment is a 10-pole 12-slot electric motor in which A=5 is established. Thus, the electric motor 10B causes 5th order variation, 10th order variation, and 60th order variation in response to one rotation of the output shaft 11. In the third embodiment, B=2 is established. Thus, the worm gear causes 2nd order variation and 4th order variation in response to one rotation of the output shaft 11. In the third embodiment, C=7 is established. Thus, the coupling 16 causes 7th order variation in response to one rotation of the output shaft of the output shaft 11. In this manner, in the third embodiment, load variations in the electric motor 10B, the worm gear, and the coupling 16 extremely hardly overlap. Thus, according to the third embodiment, load variation, vibration, and noise can be reduced.

Fourth Embodiment

Figure 14:
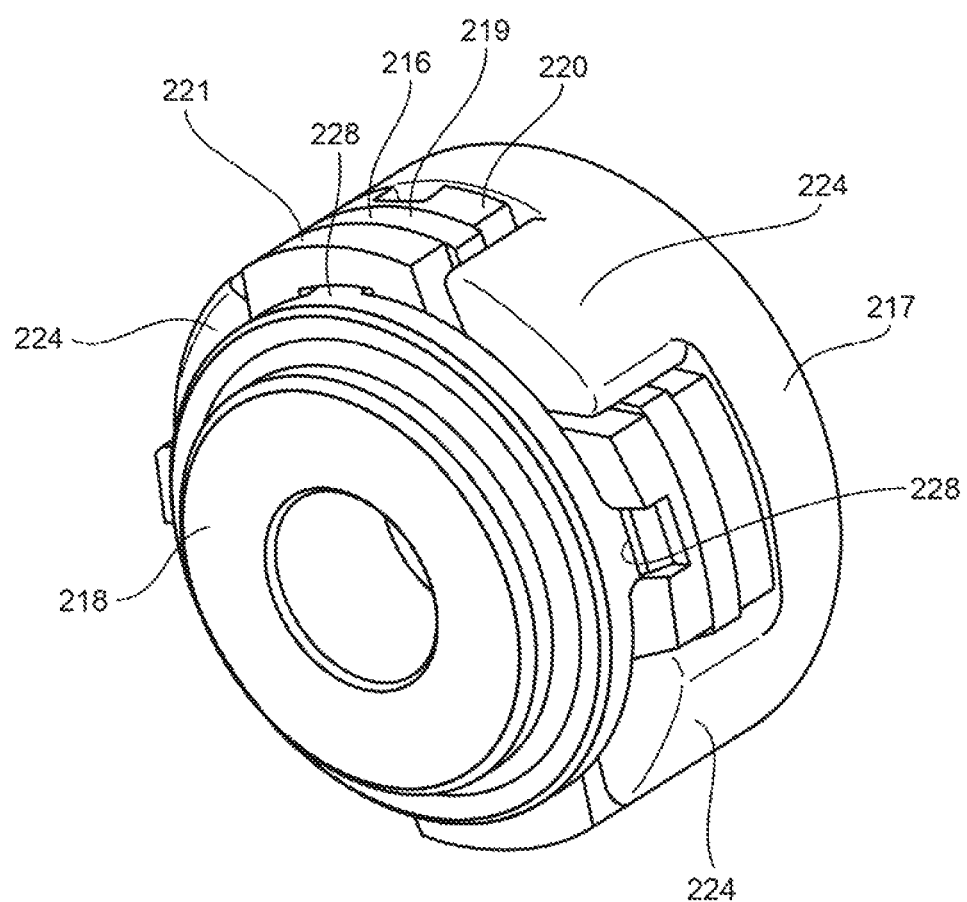
FIG. 14 is a perspective view of a coupling in a fourth embodiment.
Figure 15:
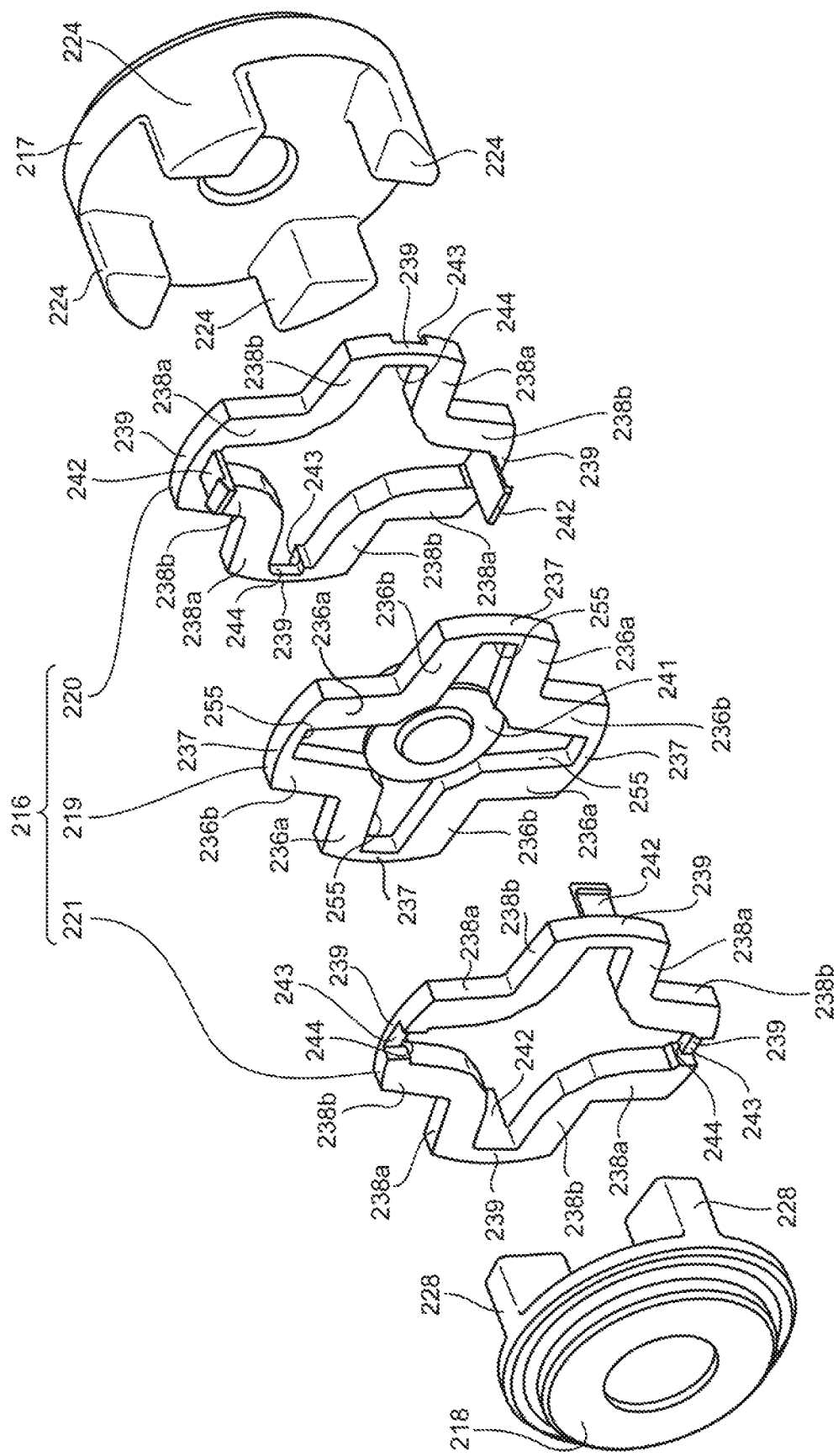
FIG. 15 is an exploded perspective view of the coupling in the fourth embodiment.

Next, a fourth embodiment is described with reference to FIG. 14 and FIG. 15. FIG. 14 is a perspective view of a coupling 216 in the fourth embodiment. FIG. 15 is an exploded perspective view of the coupling 216 in the fourth embodiment. In the fourth embodiment, the coupling 216 is employed instead of the coupling 16 in the first embodiment. The coupling 216 includes a first transmission member 217, a second transmission member 218, and a third transmission member 219 that couples the first transmission member 217 and the second transmission member 218.

The first transmission member 217 has four projections 224 extending toward the third transmission member 219. For example, the projection 224 is a fan-shaped projection whose outer side is along the outer circumference of the first transmission member 217 and whose inner side is obtuse. The first transmission member 217 is fixed to the output shaft 11 in a manner similar to the first transmission member 17. The second transmission member 218 has four projections 228 extending toward the third transmission member 219. Specifically, two pairs of two projections 228 are disposed at positions opposed to each other across the center axis of the rotation shaft portion 94*b* fixed to the second transmission member 218. The two pairs of the projections 228 have a positional relation in which straight lines connecting the second transmission members 218 in the pairs are orthogonal to each other.

The third transmission member 219 is a plate-shaped member in which L-shaped side portions 236*a* and 236*b* continuous so as to draw an obtuse angle and a peripheral portion 237 that connects the side portion 236*a* of one of the two L shapes and the side portion 236*b* of the other L shape are continuous so as to form holes corresponding to the shapes of outer peripheral-side cutout portions corresponding to obtuse angles of the first transmission member 217 and the shapes of the projections 228. In the third transmission member 219, the side portion 236*a*, the side portion 236*b*, and the peripheral portion 237 sequentially arranged continuous to form a ring. The cutout portion in the form of the L shape drawn by the continuous side portions 236*a* and 236*b* is directed to the outer side of the third transmission member 219. The cutout portion in the form of the L shape is engaged with the projection 224. A hole 255 on the inner peripheral side that is sandwiched between the side portion 236*a* of one of two L shapes continuous across the peripheral portion 237 and the side portion 236*b* of the other L shape is engaged with the projection 228. The rotation order of the coupling 216 in the fourth embodiment is 4.

In the fourth embodiment, an elastic member 220 is interposed between the first transmission member 217 and the third transmission member 219. An elastic member 221 is interposed between the second transmission member 218 and the third transmission member 219. The elastic members 220 and 221 are plate-shaped members in which L-shaped side portions 238*a* and 238*b* continuous so as to draw an obtuse angle and a peripheral portion 239 that connects the side portion 238*a* of one of the two L shapes and the side portion 238*b* of the other L shape are continuous. The elastic members 220 and 221 further include claws 242 and cutout portions 243. The claws 242 extend from two opposed peripheral portions 239 of the four peripheral portions 239 toward the third transmission member 219. The cutout portions 243 are provided in two peripheral portions 239 from which the claws 242 do not extend. A hooking structure of the claw 242 is fitted to a cutout structure of the cutout portion 243. The positions of the claw 242 and the cutout portion 243 in the elastic member 220 are out of phase with the positions of the claw 242 and the cutout portion 243 in the elastic member 221 by 90°. In this manner, the claws 242 of one of the elastic member 220 and the elastic member 221 are fitted to the cutout portions 243 of the other elastic member, and the claws 242 of the other elastic member are fitted to the cutout portions 243 of the one elastic member. Consequently, the elastic member 220 and the elastic member 221 are fixed to each other with the third transmission member 219 therebetween.

The third transmission member 219 has a disc-shaped support portion 241 at a center part of the plate surface. In this manner, the side portions 236*a* and 236*b* can be supported from the inner peripheral side, and this further enhances the rigidity. The materials and the forming methods of the first transmission member 217, the second transmission member 218, the third transmission member 219, and the elastic members 220 and 221 may be the same as those of the first transmission member 17, the second transmission member 18, the third transmission member 19, and the elastic members 20 and 21, respectively.

In the fourth embodiment, the electric motor 10B in the third embodiment is employed (see FIG. 13). Thus, in the fourth embodiment, when a multiplication of two natural numbers other than 1 expresses the number of poles of the magnet 13B, the larger natural number of the two natural numbers is 5. In the fourth embodiment, as in the case of the second embodiment, the worm gear shaft 94 has the worm 94*c* (see FIG. 11). Thus, in the fourth embodiment, the rotation order of the worm 94*c* is 3. In other words, in the fourth embodiment, A:B:C=5:3:4 is established. In this manner, in the fourth embodiment, the smallest rotation order among rotation orders of the electric motor 10B, the rotation order of the worm 94*c*, and the rotation order of the coupling 216 are prime to one another. The configurations of an assist mechanism and an electric power steering device in the fourth embodiment are the same as in the first embodiment except for the points described above.

The fourth embodiment is a 10-pole 12-slot electric motor in which A=5 is established. Thus, the electric motor 10B causes 5th order variation, 10th order variation, and 60th order variation in response to one rotation of the output shaft 11. In the fourth embodiment, B=3 is established. Thus, the worm gear causes 3rd order variation and 6th order variation in response to one rotation of the output shaft 11. In the fourth embodiment, C=4 is established. Thus, the coupling 216 causes 4th order variation in response to one rotation of the output shaft of the output shaft 11. In this manner, in the fourth embodiment, load variations in the electric motor 10B, the worm gear, and the coupling 216 extremely hardly overlap. Thus, according to the fourth embodiment, load variation, vibration, and noise can be reduced.

Fifth Embodiment

Figure 16:
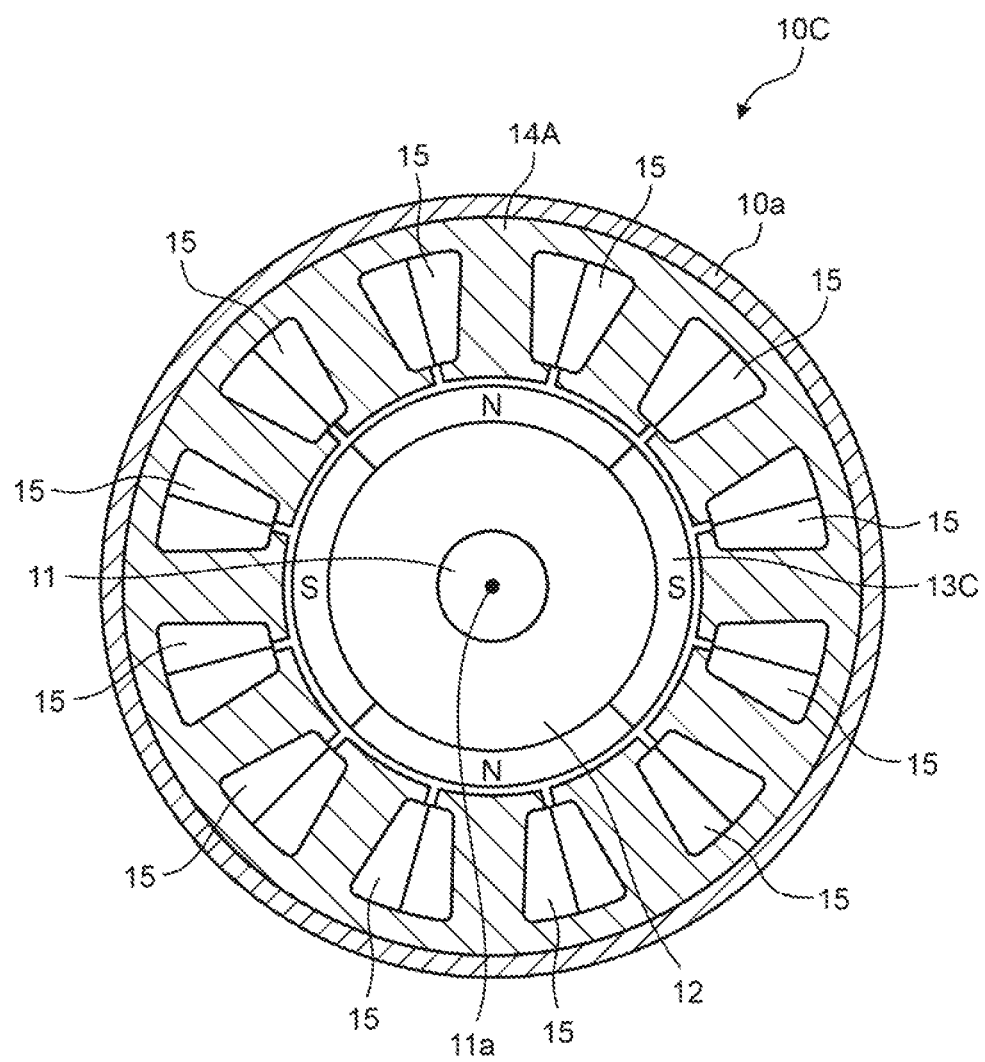
FIG. 16 is a diagram illustrating a configuration example of an electric motor in a fifth embodiment.

Next, a fifth embodiment is described with reference to FIG. 16. FIG. 16 is a diagram illustrating a configuration example of an electric motor 10C in the fifth embodiment. The electric motor 10C in the fifth embodiment includes a magnet 13C instead of the magnet 13A included in the electric motor 10A in the second embodiment. The electric motor 10C has the same configuration as that of the electric motor 10A except for the difference between the magnet 13A and the magnet 13C. The magnet 13A and the magnet 13C have the same configuration except for the number of poles of the magnet.

The number of poles of the magnet 13C in the fifth embodiment is 4. In other words, two N poles and two S poles are alternatingly disposed circularly at intervals of 90 degrees about the rotation axis center 11*a*. The electric motor 10C in the fifth embodiment is what is called a "4-pole 12-slot" motor. That is, the number of poles of the magnet 13C can be expressed as 4=2×2. Thus, in the fifth embodiment, when a multiplication of two natural numbers other than 1 expresses the number of poles of the magnet 13C, the larger natural number of the two natural numbers is 2.

In the fifth embodiment, the rotation order of the worm and the rotation order of the coupling that are prime to the smallest rotation order among rotation orders of the electric motor 10C are employed. Specifically, in the fifth embodiment, for example, as in the case of the second embodiment, the worm gear shaft 94 has the worm 94c (see FIG. 11). In the fifth embodiment, for example, the same coupling 16 as in the first embodiment or the same coupling 116 as in the modification is employed. Thus, in the fifth embodiment, A:B:C=2:3:7 or A:B:C=2:3:5 is established. The configurations of an assist mechanism and an electric power steering device in the fifth embodiment are the same as in the first embodiment or the modification except for the points described above. In this manner, also in the fifth embodiment, load variations in the electric motor 10C, the worm gear, and the coupling 16 or the coupling 116 extremely hardly overlap. Thus, according to the fifth embodiment, load variation, vibration, and noise can be reduced.

Sixth Embodiment

Figure 17:
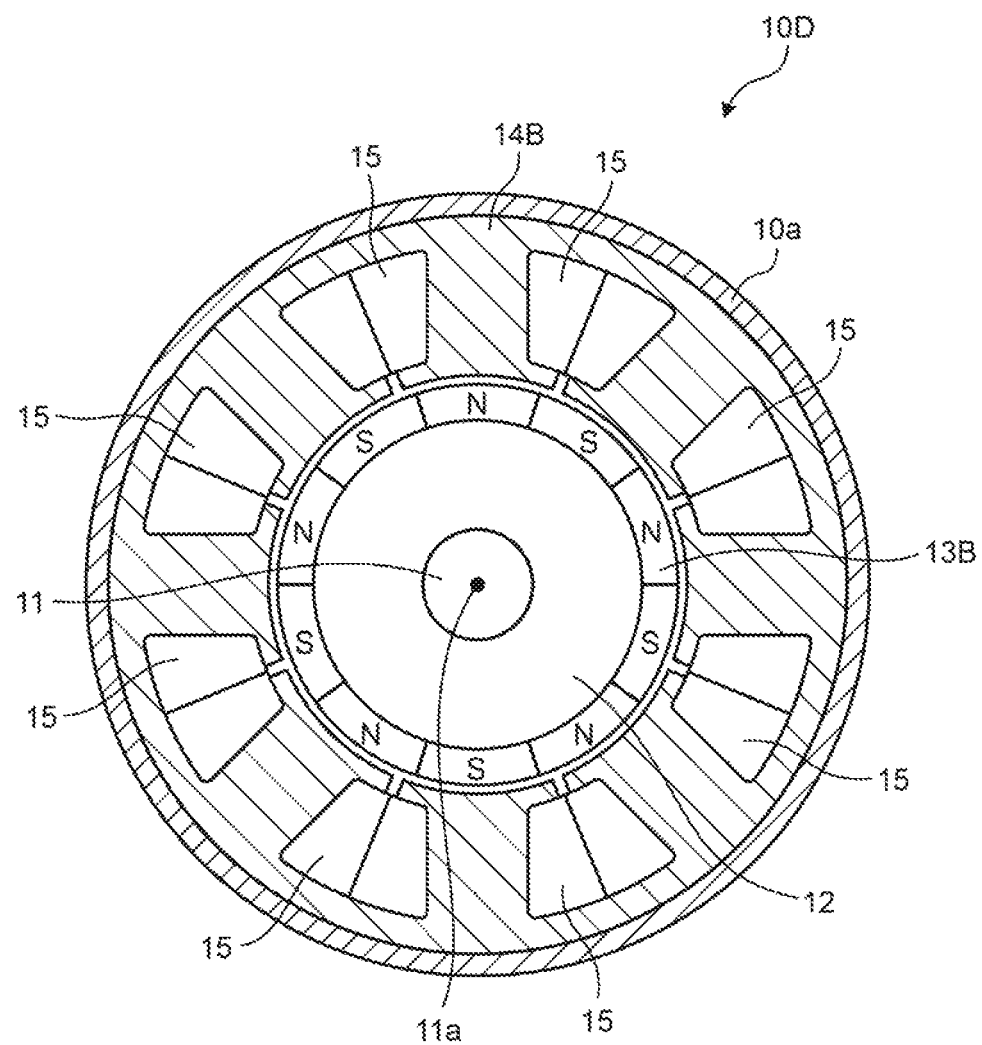
FIG. 17 is a diagram illustrating a configuration example of an electric motor in a sixth embodiment.

Next, a sixth embodiment is described with reference to FIG. 17. FIG. 17 is a diagram illustrating a configuration example of an electric motor 10D in the sixth embodiment. The electric motor 10D in the sixth embodiment includes a stator 14B instead of the stator 14A included in the electric motor 10B (see FIG. 13) in the third embodiment. The electric motor 10D has the same configuration as that of the electric motor 10B except for the difference between the stator 14A and the stator 14B. The stator 14A and the stator 14B have the same configuration except for the number of windings 15 and the number of grooves provided with the windings 15.

The number of poles of magnets 13B in the sixth embodiment is 10. The number of windings 15 in the sixth embodiment is 8. The electric motor 10D in the sixth embodiment is what is called a "10-pole 8-slot" motor. Thus, in the sixth embodiment, when a multiplication of two natural numbers other than 1 expresses the number of poles of the magnet 13B, the larger natural number of the two natural numbers is 5.

In the sixth embodiment, the rotation order of the worm and the rotation order of the coupling that are prime to the smallest rotation order among rotation orders of the electric motor 10D are employed. For example, in the sixth embodiment, for example, the same worm 94a and the same coupling 16 as in the first embodiment are employed. Thus, in the sixth embodiment, A:B:C=5:2:7 is established. In the sixth embodiment, the worm 94c (see FIG. 11) may be employed instead of the worm 94a. In this case, A:B:C=5:3:7 is established. The configurations of an assist mechanism and an electric power steering device in the sixth embodiment are the same as in the first embodiment except for the points described above. In this manner, also in the sixth embodiment, load variations in the electric motor 10D, the worm gear, and the coupling 16 extremely hardly overlap. Thus, according to the sixth embodiment, load variation, vibration, and noise can be reduced.

Seventh Embodiment

Figure 18:
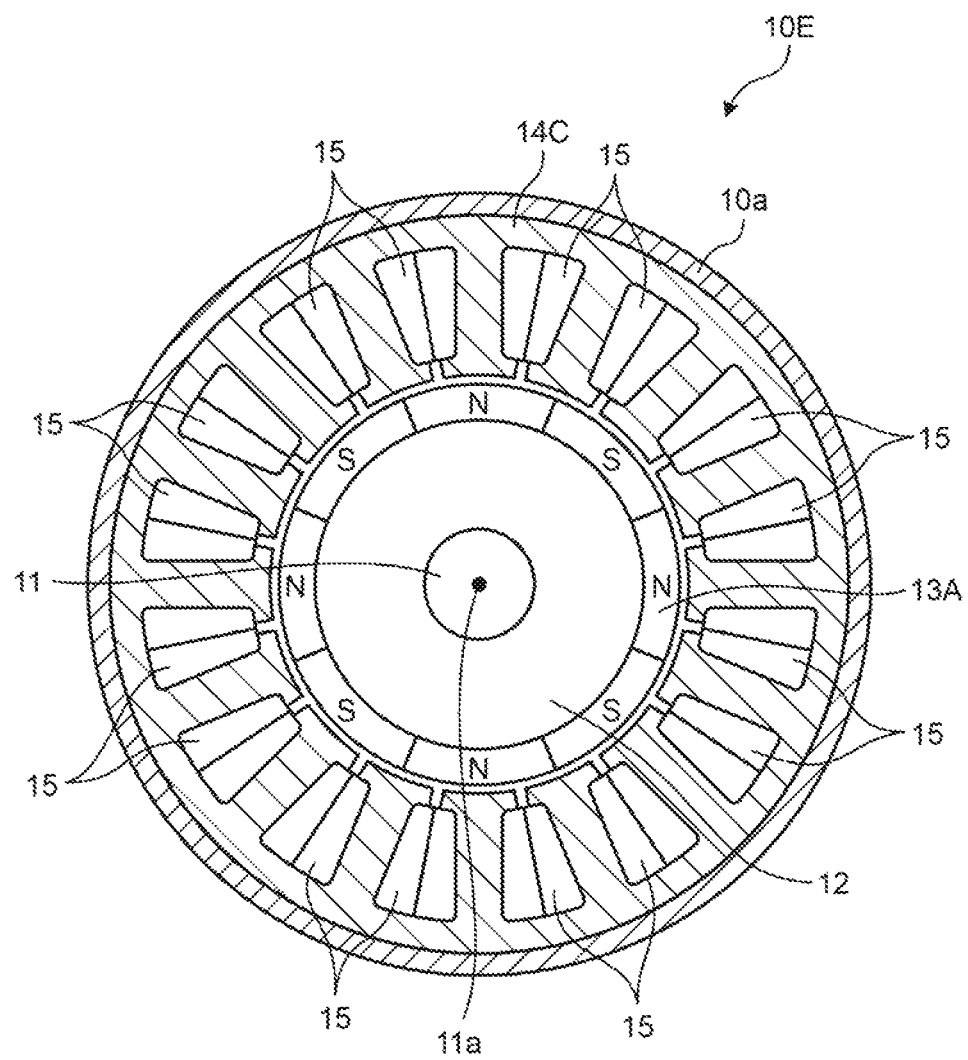
FIG. 18 is a diagram illustrating a configuration example of an electric motor in a seventh embodiment.

Next, a seventh embodiment is described with reference to FIG. 18. FIG. 18 is a diagram illustrating a configuration example of an electric motor 10E in the seventh embodiment. The electric motor 10E in the seventh embodiment includes a stator 14C instead of the stator 14A included in the electric motor 10A (see FIG. 12) in the second embodiment. The electric motor 10E has the same configuration as that of the electric motor 10A except for the difference between the stator 14A and the stator 14C. The stator 14A and the stator 14C have the same configuration except for the number of windings 15 and the number of grooves provided with the windings 15.

The number of poles of a magnet 13A in the seventh embodiment is 8. The number of windings 15 in the seventh embodiment is 16. The electric motor 10E in the seventh embodiment is what is called a "8-pole 16-slot" motor. Thus, in the seventh embodiment, when a multiplication of two natural numbers other than 1 expresses the number of poles of the magnet 13A, the larger natural number of the two natural numbers is 4.

In the seventh embodiment, the rotation order of the worm and the rotation order of the coupling that are prime to the smallest rotation order among rotation orders of the electric motor 10E are employed. Specifically, in the seventh embodiment, for example, as in the case of the second embodiment, the worm gear shaft 94 has the worm 94c (see FIG. 11). In the seventh embodiment, for example, the same coupling 16 as in the first embodiment or the same coupling 116 as in the modification is employed. Thus, in the seventh embodiment, A:B:C=4:3:7 or A:B:C=4:3:5 is established. The configurations of an assist mechanism and an electric power steering device in the seventh embodiment are the same as in the first embodiment or the modification except for the points described above. In this manner, also in the seventh embodiment, load variations in the electric motor 10E, the worm gear, and the coupling 16 or the coupling 116 extremely hardly overlap. Thus, according to the seventh embodiment, load variation, vibration, and noise can be reduced.

Eighth Embodiment

Figure 19:
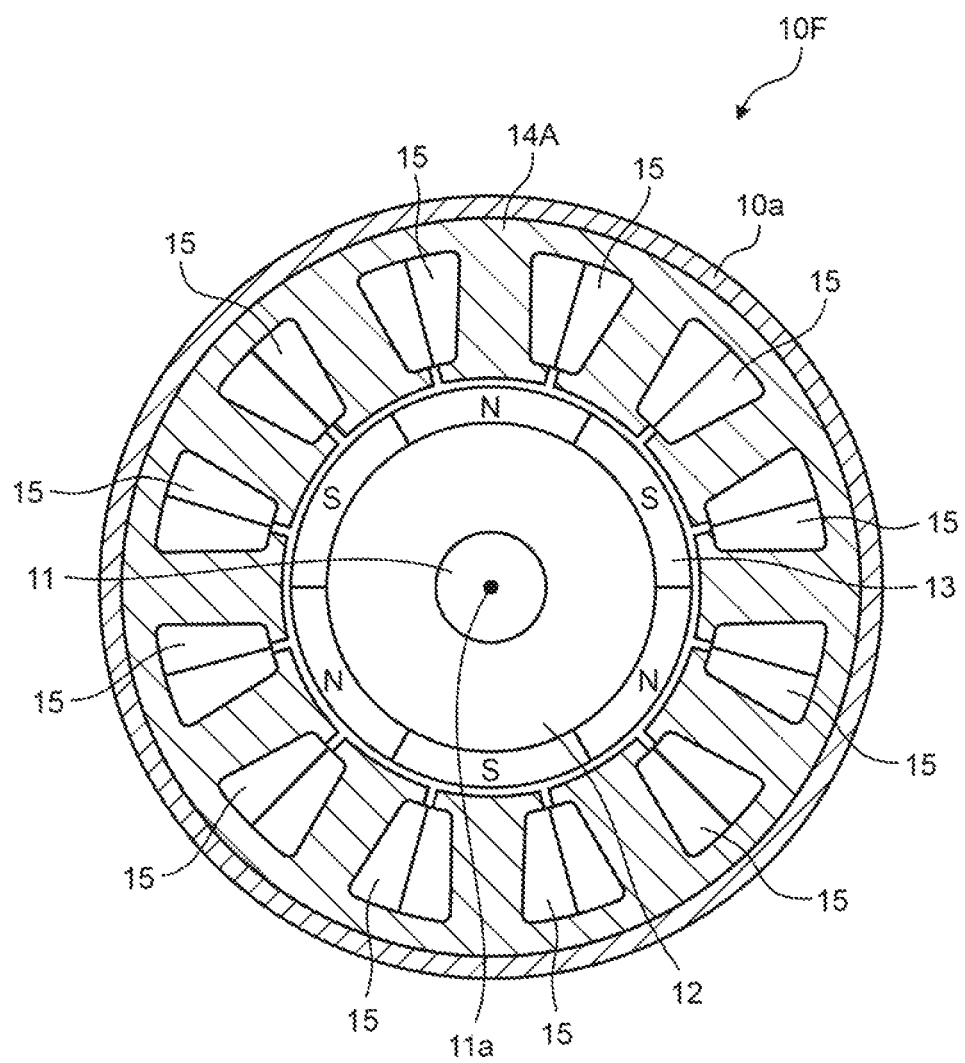
FIG. 19 is a diagram illustrating a configuration example of an electric motor in an eighth embodiment.

Next, an eighth embodiment is described with reference to FIG. 19. FIG. 19 is a diagram illustrating a configuration example of an electric motor 10F in the eighth embodiment. The electric motor 10F in the eighth embodiment includes the magnet 13 (see FIG. 7) included in the electric motor 10 in the first embodiment and the stator 14A (see FIG. 12) included in the electric motor 10A in the second embodiment. The electric motor 10F has the same configuration as that of the electric motor 10 except for the difference between the stator 14 and the stator 14A.

The electric motor 10F in the eighth embodiment is what is called a "6-pole 12-slot" motor. Thus, in the eighth embodiment, when a multiplication of two natural numbers other than 1 expresses the number of poles of the magnet 13, the larger natural number of the two natural numbers is 3.

In the eighth embodiment, the rotation order of the worm and the rotation order of the coupling that are prime to the smallest rotation order among rotation orders of the electric motor 10F are employed. Specifically, in the eighth embodiment, for example, the same worm 94a and the same coupling 16 as in the first embodiment are employed. Thus, in the eighth embodiment, A:B:C=3:2:7 is established. The configurations of an assist mechanism and an electric power steering device in the eighth embodiment are the same as in the first embodiment except for the points described above. In this manner, also in the eighth embodiment, load variations in the electric motor 10F, the worm gear, and the coupling 16 extremely hardly overlap. Consequently, according to the eighth embodiment, load variation, vibration, and noise can be reduced. In the eighth embodiment, the modification may be applied as in the case of the first embodiment. In other words, in the eighth embodiment, the coupling 116 may be employed instead of the coupling 16.

In this case, A:B:C=3:2:5 is established. Also in the modification of the eighth embodiment, load variation, vibration, and noise can be reduced.

The combination of the smallest rotation order among rotation orders of the electric motor, the rotation order of the worm, and the rotation order of the coupling is not limited to the ones exemplified in the above-mentioned embodiments and modifications. At least two rotation orders of the smallest rotation order among rotation orders of the electric motor, the rotation order of the worm, and the rotation order of the coupling only need to be prime to each other. The specific forms of the coupling are not limited to the couplings 16, 116, and 216, and can be changed as appropriate within the range not departing from the matters specifying the present invention. The electric motor may be what is called an "outer rotor", in which a rotor is located on the outer peripheral side of a stator. The specific forms of the other configurations can also be changed as appropriate within the range not departing from the matters specifying the present invention.

The above-mentioned electric motor is a brushless motor, but may be a brushed motor. When the electric motor is a brushed motor, the rotor has a winding and the stator has a magnet. A commutator corresponding to the number of poles of the winding is provided to the rotor, and a brush to be brought into sliding contact with the commutator to supply current is provided. When the electric motor is a brushed motor, the rotation order of the electric motor is n times a larger natural number of two natural numbers other than 1 when a multiplication of the two natural numbers expresses the number of poles of the commutator in the rotor. For example, the smallest rotation order among rotation orders of a brushed motor in which the number of commutators is 6 (2×3) is 3. The smallest rotation order among rotation orders of a brushed motor in which the number of commutators is 8 (2×4) is 4. The smallest rotation order among rotation orders of a brushed motor in which the number of commutators is 10 (2×5) is 5.

In the above-mentioned embodiments and modifications, at least two rotation orders of the smallest rotation order among rotation orders of the electric motor, the rotation order of the worm, and the rotation order of the coupling are prime to each other, but the rotation orders are not limited to being "prime to each other", and may be "different from each other". In other words, at least two rotation orders of the smallest rotation order among rotation orders of the electric motor, the rotation order of the worm, and the rotation order of the coupling only need to be different from each other. Consequently, vibration and noise can be reduced as compared with the case where all rotation orders of the smallest rotation order among rotation orders of the electric motor, the rotation order of the worm, and the rotation order of the coupling are equal to one another.

The invention claimed is:

1. An electric power steering device comprising an assist mechanism, wherein
    the assist mechanism comprises:
        an electric motor;
        a shaft-shaped member in which a worm engaged with a worm wheel is formed; and
        a coupling that couples an output shaft of the electric motor and the shaft-shaped member to each other,
    a rotation order of the worm and a rotation order of the coupling are prime to each other,
    the rotation order of the worm is the number of teeth of the worm wheel that advance in response to one rotation of the shaft-shaped member,
    the coupling comprises:
        a first transmission member fixed to the output shaft;
        a second transmission member fixed to the shaft-shaped member; and
        a third transmission member engaged with a predetermined number of projections of each of the first transmission member and the second transmission member to couple the first transmission member and the second transmission member to each other,
    the worm wheel is provided to an output shaft of a steering wheel,
    the electric power steering device is a column assist power steering device,
    the first transmission member and the second transmission member have the same number of projections,
    the rotation order of the coupling is equal to the number of the projections,
    a first elastic member is provided between the first transmission member and the third transmission member,
    a second elastic member is provided between the second transmission member and the third transmission member, and
    the third transmission member has higher rigidity than the first elastic member and the second elastic member.

2. The electric power steering device according to claim 1, wherein
    a smallest rotation order among rotation orders of the electric motor and a rotation order of the worm are prime to each other, and the smallest rotation order among the rotation orders of the electric motor and a rotation order of the coupling are prime to each other.

3. The electric power steering device according to claim 1, wherein
    the rotation order of the electric motor is n times a larger natural number of two natural numbers other than 1 when a multiplication of the two natural numbers expresses the number of poles of a magnet in the rotor, and
    n is a natural number of 1 or greater.

4. The electric power steering device according to claim 1, wherein the rotation order of the coupling is 5 or 7.

5. The electric power steering device according to claim 1, wherein
    the smallest rotation order among the rotation orders of the electric motor is 3,
    the rotation order of the worm is 2, and
    the rotation order of the coupling is 5 or 7.

6. The electric power steering device according to claim 1, wherein
    the smallest rotation order among the rotation orders of the electric motor is 4,
    the rotation order of the worm is 3, and
    the rotation order of the coupling is 5 or 7.

7. The electric power steering device according to claim 1, wherein
    the smallest rotation orders among the rotation orders of the electric motor is 5,
    the rotation order of the worm is 2, and
    the rotation order of the coupling is 7.

8. The electric power steering device according to claim 1, wherein
    the smallest rotation order among the rotation orders of the electric motor is 5,
    the rotation order of the worm is 3, and
    the rotation order of the coupling is 4.

9. The electric power steering device according to claim 1, wherein
at least two rotation orders of a smallest rotation order among rotation orders of the electric motor, a rotation order of the worm, and a rotation order of the coupling are different from each other.

10. The electric power steering device according to claim 1, wherein
the smallest rotation order among the rotation orders of the electric motor, the rotation order of the worm, and the rotation order of the coupling are different from one another.

11. The electric power steering device according to claim 1, wherein
the rotation order of the electric motor is n times a larger natural number of two natural numbers other than 1 when a multiplication of the two natural numbers expresses the number of poles of a magnet or a commutator in the rotor, and
n is a natural number of 1 or greater.

12. An electric power steering device comprising an assist mechanism, wherein
the assist mechanism comprises:
an electric motor in which a rotor has a magnet and a stator has a winding;
a shaft-shaped member in which a worm engaged with a worm wheel is formed; and
a coupling that couples an output shaft of the electric motor and the shaft-shaped member to each other,
a smallest rotation order among rotation orders of the electric motor and a rotation order of the worm are prime to each other,
the rotation order of the electric motor is n times a larger natural number of two natural numbers other than 1 when a multiplication of the two natural numbers expresses the number of poles of a magnet in the rotor,
n is a natural number of 1 or greater,
the rotation order of the worm is the number of teeth of the worm wheel that advance in response to one rotation of the shaft-shaped member,
the worm wheel is provided to an output shaft of a steering wheel,
the electric power steering device is a column assist power steering device,
the first transmission member and the second transmission member have the same number of projections,
the rotation order of the coupling is equal to the number of the projections,
a first elastic member is provided between the first transmission member and the third transmission member,
a second elastic member is provided between the second transmission member and the third transmission member, and
the third transmission member has higher rigidity than the first elastic member and the second elastic member.

13. The electric power steering device according to claim 12, wherein
the rotation order of the coupling is 5 or 7.

14. An electric power steering device comprising an assist mechanism, wherein:
the assist mechanism comprises:
an electric motor;
a shaft-shaped member in which a worm engaged with a worm wheel is formed; and
a coupling that couples an output shaft of the electric motor and the shaft-shaped member to each other, wherein
a smallest rotation order among rotation orders of the electric motor and a rotation order of the coupling are prime to each other,
the rotation order of the electric motor is n times a larger natural number of two natural numbers other than 1 when a multiplication of the two natural numbers expresses the number of poles of a magnet or a commutator in a rotor,
n is a natural number of 1 or greater,
the coupling includes
a first transmission member fixed to the output shaft;
a second transmission member fixed to the shaft-shaped member; and
a third transmission member engaged with a predetermined number of projections of each of the first transmission member and the second transmission member to couple the first transmission member and the second transmission member to each other,
the worm wheel is provided to an output shaft of a steering wheel,
the electric power steering device is a column assist power steering device,
the first transmission member and the second transmission member have the same number of projections,
the rotation order of the coupling is equal to the number of the projections,
a first elastic member is provided between the first transmission member and the third transmission member,
a second elastic member is provided between the second transmission member and the third transmission member, and
the third transmission member has higher rigidity than the first elastic member and the second elastic member.

* * * * *